United States Patent
Yamada et al.

[19]

[11] Patent Number: 6,037,741
[45] Date of Patent: Mar. 14, 2000

[54] MOTOR CONTROLLER AND METHOD OF CONTROLLING MOTOR

[75] Inventors: Eiji Yamada, Owariasahi; Yasutomo Kawabata, Aichi-ken, both of Japan

[73] Assignee: Toyota Jidosha Kabushiki Kaisha, Toyota, Japan

[21] Appl. No.: 09/302,377

[22] Filed: Apr. 30, 1999

[30] Foreign Application Priority Data

May 28, 1998 [JP] Japan .................................. 10-166193

[51] Int. Cl.⁷ ................................. H02P 6/18; H02P 6/08
[52] U.S. Cl. .......................... 318/721; 318/432; 318/439
[58] Field of Search ..................................... 318/138, 254, 318/432, 433, 439, 700, 720, 721, 722, 724

[56] References Cited

U.S. PATENT DOCUMENTS

| 5,448,149 | 9/1995 | Ehsani et al. | 318/701 |
| 5,635,810 | 6/1997 | Goel | 318/719 |
| 5,903,129 | 5/1999 | Okuno et al. | 318/721 |

FOREIGN PATENT DOCUMENTS

| 7-177788 | 7/1995 | Japan . |
| 9-72758 | 3/1997 | Japan . |

Primary Examiner—Bentsu Ro

Attorney, Agent, or Firm—Oliff & Berridge, PLC

[57] ABSTRACT

When there is a change in required torque, the prior art technique may cause the undesirably low accuracy in the sensor-free determination of the electrical angle. A motor controller of the present invention has the following configuration to control the operation of a synchronous motor, in which multi-phase alternating currents flow through coils to rotate a rotor. The motor controller includes an electrical angle determination unit, which applies a voltage for determination to the coils and determines the electrical angle of the rotor in a sensor-free manner, based on the electric currents flowing in response to the applied voltage for determination. The motor controller also has a torque control unit that applies a voltage for torque output to the coils, corresponding to the required torque. An adjustment unit included in the motor controller adjusts the execution timings of the electrical angle determination unit and the torque control unit, so as to prevent the variation in electric current by the torque control unit from affecting the execution of the electrical angle determination unit. One possible procedure schedules the execution timings of the electrical angle determination unit and the torque control unit. Another possible procedure causes the execution of the electrical angle determination unit to wait according to a variation in required torque. This arrangement enables the electrical angle to be determined with a high accuracy even in the case of a torque variation.

9 Claims, 20 Drawing Sheets

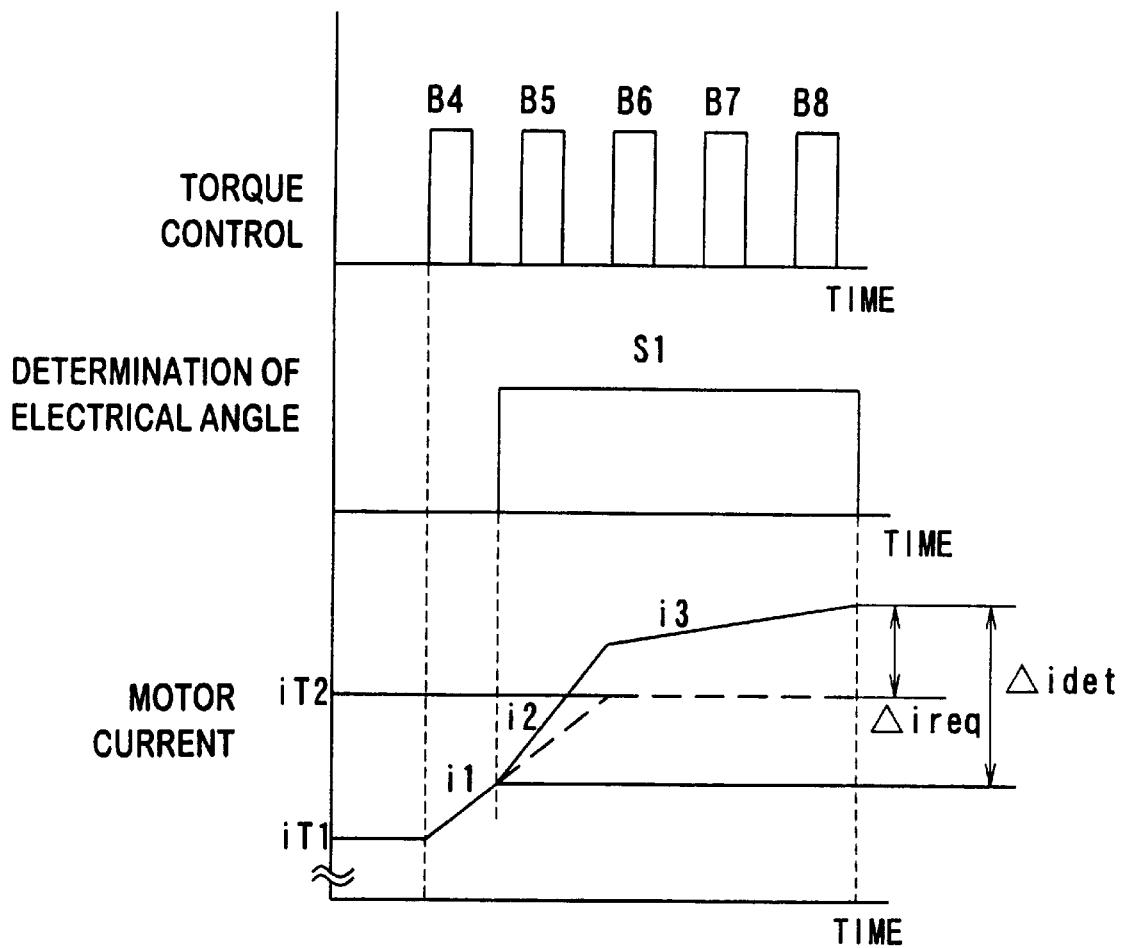

MOTOR CONTROLLER AND METHOD OF CONTROLLING MOTOR

BACKGROUND OF THE INVENTION

1. Field of the Invention

The present invention relates to a motor controller that controls operation of a synchronous motor by determining an electrical angle in a sensor-free manner, as well as to a method of controlling a motor.

2. Description of the Related Art

In a synchronous motor that flows multi-phase alternating currents through windings and rotates a rotor by, it is required to regulate the multi-phase alternating currents made to flow through the windings according to the position of the rotor, that is, according to the electrical angle, in order to obtain a desired rotational torque. An electrical angle sensor, for example, utilizing a Hall element, has conventionally been used to determine the electrical angle of the rotor.

Some techniques have been proposed to determine the electrical angle in a sensor-free manner, in order to improve the reliability simultaneously with reduction of the cost. For example, JAPANESE PATENT LAID-OPEN GAZETTE No. 7-177788 discloses such a technique. When the motor rotates at a relatively low speed, the procedure of this proposed technique applies a specific voltage between the windings of the motor and monitors a behavior of electric currents made to flow in response to the applied voltage, so as to determine the electrical angle.

The following describes one concrete procedure of the electrical angle determination. In the case of a salient pole-type permanent magnet motor where the magnetic resistance in a magnetic circuit changes according to the angle of the rotor, a variation in electrical angle of the rotor varies the inductance of the windings and changes the behavior of the electric currents under the condition that a voltage is applied to the windings. By way of example, referring to the graph of FIG. 9, the greater inductance decreases the electric current at the time point when a preset time period has elapsed since the application of the voltage. There is a theoretical relationship between the inductance and the value of electric current. The apparatus for determining the electrical angle filed by the applicant of the present invention has been developed by taking into account this characteristic. In the proposed apparatus for determining the electrical angle, the relationship between the inductance and the electrical angle is stored in advance in the form of a table. The technique measures electric currents made to flow in response to a voltage applied to the windings, calculates an inductance from the behavior of the observed electric currents, and refers to the table to read the electrical angle corresponding to the calculated inductance. In order to determine the electrical angle with a high accuracy in this apparatus, it is required to precisely grasp the relationship between the applied voltage and the behavior of the electric current made to flow in response to the voltage.

When this prior art technique is applied to determine the electrical angle in a sensor-free manner, a voltage is applied for the determination of the electrical angle as shown in FIG. 9. The torque voltage is originally applied to the windings of the motor, in order to make a flow of the electric current relating to the output of the torque. The voltage for determination and the torque voltage are applied by separate control processes.

The graph of FIG. 20 shows the timings of the torque control and the electrical angle determination. B1, B2, B3 in FIG. 20 denote the execution timings of the torque control. In the actual state, a voltage is applied at a specific duty in the respective divisions B1, B2, B3 according to the voltage command value. In the example of FIG. 20, the torque command value takes a fixed value and the motor current has a constant effective value iT. S1 in FIG. 20 represents the execution timing of the electrical angle determination. Since the voltage for determination is applied over the substantially whole period of the electrical angle determination, the division S1 in FIG. 20 is substantially synonymous with the time period of application of the voltage for determination.

As shown in FIG. 20, the torque control is executed at narrower intervals than those of the electrical angle determination. The torque control is carried out even in the course of the determination of the electrical angle (see the processing at the timings B5 through B8 in FIG. 20). The control process in this period, however, does not newly read the torque command value but applies the voltage based on the torque command value previously input. While the voltage for determination is applied, the torque voltage for outputting the torque does not change, but the motor current has a fixed value iT. When the voltage for determination is superposed upon the torque voltage, the motor current varies as shown by a curve iS in FIG. 20. Since the value of the motor current is fixed during the application of the voltage for determination, the electrical angle can be determined by measuring the variation in electric current iS corresponding to the voltage for determination, which is superposed upon the torque voltage.

The prior art technique discussed above may, however, fail in accurately determining the electrical angle according to the execution timings of the torque voltage control and the electrical angle determination. Especially when the required torque changes immediately before the execution of the electrical angle determination, the prior art technique results in significantly lowering the accuracy of the determination of the electrical angle.

The lower accuracy of the determination of the electrical angle may interfere with the smooth operation of the motor; for example, it may cause a discontinuous variation in torque output from the synchronous motor. The non-smooth operation results in lowering the driving efficiency of the motor.

SUMMARY OF THE INVENTION

The object of the present invention is to provide a technique applicable to a motor controller, which controls operation of a synchronous motor in a sensor-free manner, as well as to a method of controlling the synchronous motor, in order to ensure smooth operation of the synchronous motor even when there is a variation in required torque.

At least part of the above and the other related objects is attained by a first motor controller that regulates multi-phase alternating currents made to flow through windings, thereby controlling operation of a synchronous motor, which rotates a rotor by taking advantage of a revolving magnetic field generated in the windings in the course of the flow of the multi-phase alternating currents. The first motor controller includes: a required torque setting unit that sets a required torque to be output from the motor; an electrical angle determination unit that applies a voltage for determination to the windings at a predetermined timing and determines an electrical angle of the rotor, based on a behavior of electric currents flowing through the windings in response to the applied voltage for determination; an electrical angle estimation unit that estimates an electrical angle at each timing when control of the operation of the synchronous motor is carried out, based on the electrical angle determined by the electrical angle determination unit; a torque control unit that regulates the multi-phase alternating currents made to flow through the windings, according to the required torque and the estimated electrical angle; and an adjustment unit that adjusts execution timings of the torque control unit and the electrical angle determination unit, in order to avoid an effect of the electric currents made to flow through the windings by the torque control unit on the determination of the electrical angle.

The first motor controller of the present invention enables the electrical angle to be determined with a high accuracy even when there is a variation in required torque, and thereby ensures the appropriate torque control of the synchronous motor. This results in driving the synchronous motor stably and improving the driving efficiency of the synchronous motor. The following describes the functions to actualize such effects.

For the completion of the present invention, it has been required to elucidate the reason why the conventional control method can not determine the electrical angle with a high accuracy. The technique of determining the electrical angle of the synchronous motor in a sensor-free manner has been developed recently. There have been no reports or literatures regarding the phenomenon that the accuracy of the electrical angle determination is lowered with a variation in required torque, let alone its cause.

In such circumstances, the inventors of the present invention have examined in detail a variation in motor current when there is a variation in required torque. The graph of FIG. 21 shows a variation in motor current when the required torque is changed. The graph of FIG. 21 corresponds to a division A in the graph of FIG. 20, which shows the execution timings of the torque control process and the electrical angle determination process. It is here assumed that the required torque increases at the execution timing B4 of the torque control shown in FIG. 21.

In this case, the motor current varies from an effective value iT1 corresponding to the required torque before the change to another effective value iT2 corresponding to the required torque after the change. When a voltage is applied at the timing B4 of torque control, the motor current increases as shown by a curve i1 in the graph of FIG. 21. In general, the electric current flowing through the coil actually varies with a time delay according to the inductance from the application of the voltage. In the case where the torque voltage changes immediately before the execution of the electrical angle determination process, the variation in electric current according to the torque voltage may be in a transient state at the time of starting the electrical angle determination process as shown in FIG. 21.

When a voltage is applied to determine the electrical angle in this state, the variation in electric current due to the torque voltage is superposed upon the variation in electric current due to the voltage for determination. The motor current accordingly varies at a steeper rate than the rate of the electric current variation corresponding to the voltage for determination as shown by a curve i2 in the graph of FIG. 21. After the electric current corresponding to the torque voltage shifts to the target value iT2 in the course of the application of the voltage for determination, a variation in electric current occurs in response to the applied voltage for determination as shown by a curve i3 in the graph of FIG. 21. A variation in motor current Δidet before and after the application of the voltage for determination is greater than a variation in motor current Δireq corresponding to the voltage for determination. This is also true in the case where the electric current does not shift to the target value iT2 in the course of the application of the voltage for determination. Because of this reason, the prior art technique can not measure the inductance of the coil with a high accuracy and thereby lowers the accuracy of determination of the electrical angle.

The first motor controller of the present invention has been developed, based on such analysis. In the first motor controller of the present invention, the adjustment unit adjusts the execution timings of the torque control unit and the electrical angle determination unit and makes the determination of the electrical angle free from the effect of the electric currents made to flow through the windings by the torque control unit. While the voltage for determination is applied, there is a variation in electric current only in response to the applied voltage for determination. This enables the electrical angle to be determined with a high accuracy. In the specification hereof, the values of electric current and voltage represent effective values, unless otherwise specified.

The electrical angle determination unit included in the first motor controller of the present invention is suitable for determining the electrical angle under the condition that the motor rotates at a relatively low speed. The first motor controller of the present invention may thus be applied only to the case where the motor rotates at a relatively low speed.

In accordance with one preferable application of the first motor controller, the adjustment unit adjusts the execution timings of the torque control unit and the electrical angle determination unit, in order to cause the execution of the electrical angle determination unit to precede the execution of the torque control unit.

This arrangement effectively protects the electrical angle determination unit from the effect of the variation in electric current due to the execution of the torque control unit. The torque control unit may affect the electrical angle determination unit when the multi-phase alternating currents made to flow through the windings are varied with a variation in required torque. It is accordingly desirable that the execution timings are set to activate the electrical angle determination unit, prior to a possible variation in multi-phase alternating currents by the torque control unit. By way of example, it is here assumed that the required torque set by the required torque setting unit is read every time the torque control unit carries out the torque control a preset number of times. There is a possibility of varying the multi-phase alternating currents in the torque control unit only when the torque control is executed with an input of the required torque. Otherwise there is no possibility of varying the multi-phase alternating currents in the torque control unit, except a transient response. In this case, it is desirable that the execution timings are set to activate the electrical angle determination unit, prior to an input of the required torque into the torque control unit.

In accordance with another preferable application of the first motor controller, the adjustment unit adjusts the execution timings of the torque control unit and the electrical angle determination unit, in order to cause the electrical angle determination unit to carry out the determination of the electrical angle when a predetermined time period has elapsed after the torque control unit carried out the regulation of the electricity to the windings.

Setting the execution timings in this manner enables the electrical angle determination unit to be activated when a predetermined time period has elapsed after the torque control unit carried out the torque control and the electric currents flowing through the windings have been stabilized. This arrangement accordingly ensures the accurate determination of the electrical angle without being affected by the variation in electric current by the torque control unit. The predetermined time period represents a preset time required to cause a possible variation in multi-phase alternating currents due to the torque control to be attenuated to a specific degree that does not significantly affect the determination of the electrical angle.

In this structure, the predetermined time period in the adjustment unit is set in advance to increase with an increase in rate of change of the required torque set by the required torque setting unit.

An increase in rate of change of the required torque generally increases the variation in multi-phase alternating currents by the torque control unit and lengthens the time required to stabilize the variation to the specific degree that does not significantly affect the determination of the electrical angle. A small rate of change of the required torque, on the other hand, shortens the waiting time for the execution of the electrical angle determination unit. In the first motor controller of the above application, the predetermined time period before the execution of the electrical angle determination unit is set according to the rate of change of the required torque. This arrangement enables a minimum possible value according to the rate of change of the required torque to be set to the predetermined time period before the execution of the electrical angle determination unit. This accordingly enables the accurate determination of the electrical angle while ensuring the good response of the motor controller.

In the first motor controller of the present invention, the predetermined time period may be set in a variety of ways to increase with an increase in rate of change of the required torque. One possible application sets the predetermined time period to zero in the case where the change of rate of the required torque is not greater than a specific level, and to a greater value than zero when the rate of change of the required torque is greater than the specific level. In the case of a variation in required torque at the rate of change of not greater than the specific level, the motor controller regards the effect on the electrical angle determination unit as negligibly small and activates the electrical angle determination unit immediately after the execution of the torque control.

In accordance with another preferable application, the first motor controller further includes an electric current measurement unit that observes a variation in electric currents made to flow through the windings by the torque control unit, wherein the adjustment unit adjusts the execution timing of the electrical angle determination unit and thereby causes the electrical angle determination unit to carry out the determination of the electrical angle when the observed variation in electric currents is not greater than a preset value.

This arrangement causes the electric current measurement unit to determine whether or not there is a variation in multi-phase alternating currents by the torque control unit and allows the electrical angle determination unit to carry out the determination of the electrical angle when the variation in multi-phase alternating currents is sufficiently attenuated. This arrangement accordingly ensures the accurate determination of the electrical angle without being affected by the variation in electric current by the torque control unit.

The first motor controller of the above structure may be adopted in the following two applications. The first application prohibits the execution of the electrical angle determination unit even at the execution timing of the electrical angle determination unit, in the case where the electric current measurement unit detects a variation in electric current of greater than the preset value. This application allows the execution of the electrical angle determination unit only at a specific timing that ensures the accurate determination of the electrical angle. The second application permits the execution of the electrical angle determination unit in the case where the electric current measurement unit detects a variation in electric current of not greater than the preset value, while the execution of the electrical angle determination unit is restricted by another mechanism. For example, the mechanism prohibits the execution of the electrical angle determination process unconditionally for a preset time period after the torque control unit changes the required torque. The motor controller of this second application carries out the determination of the electrical angle at the time point when the variation in electric current becomes not greater than the preset value. This arrangement does not delay the determination of the electrical angle unnecessarily. This accordingly enables the accurate determination of the electrical angle, while ensuring the good response of the motor controller.

The present invention is also directed to a second motor controller that regulates multi-phase alternating currents made to flow through windings, thereby controlling operation of a synchronous motor, which rotates a rotor by taking advantage of a revolving magnetic field generated in the windings in the course of the flow of the multi-phase alternating currents. The second motor controller includes: a required torque setting unit that sets a required torque to be output from the motor; a first electrical angle determination unit that applies a voltage for determination to the windings at a predetermined timing and determines an electrical angle, which defines an electrical position of the rotor, based on a behavior of electric currents flowing through the windings in response to the applied voltage for determination; an electrical angle estimation unit that estimates an electrical angle at each timing when control of the operation of the synchronous motor is carried out, based on the electrical angle determined by the first electrical angle determination unit; a torque control unit that regulates the multi-phase alternating currents made to flow through the windings according to the required torque and the estimated electrical angle, so as to enable output of the required torque; and a second electrical angle determination unit that, when the electric currents made to flow through the windings at the predetermined timing by the torque control unit are not less than a predetermined level, carries out the determination of the electrical angle in response to the voltage applied to the windings by the torque control unit, instead of the voltage for determination applied by the first electrical angle determination unit.

In the second motor controller, when the electric currents made to flow through the windings by the torque control unit are not less than the predetermined level, the voltage applied to the windings by the torque control unit, instead of the voltage for determination applied on the execution of the electrical angle determination unit, is used for the determination of the electrical angle. In the case of a variation in required torque, the electric current made to flow through the winding by the torque control unit varies as shown by the curve i1 in the graph of FIG. 21. When the voltage applied at the timing B4 of the torque control process is taken as the voltage for determination, the measurement of the variation in electric current i1 in response to the voltage leads to the determination of the electrical angle. This structure ensures the accurate determination of the electrical angle. Another advantage is to determine the electrical angle without changing the execution timing of the electrical angle determination unit in the case where the torque control unit affects the determination of the electrical angle.

When there is a necessity of changing the multi-phase alternating currents, for example, when the required torque varies, the general procedure applies a voltage that is greater than the voltage necessary for the flow of the required electric current at the initial stage of the voltage application, in order to attain a required change of the electric current within the shortest possible time. Although such a large voltage is applied only for a very short time period, application of the large voltage enables the variation in electric current to be sufficiently detected and ensures the determination of the electrical angle. A sufficient variation in electric current in response to the voltage is required to determine the electrical angle based on the voltage applied for such a very short time period.

The predetermined level may be set according to the motor as a value that ensures the determination of the electrical angle with a sufficiently high accuracy. Another preferable modification may set the predetermined level by taking into account the result of the decision that determines whether or not the variation in electric current by the torque control unit significantly affects the determination of the electrical angle.

In accordance with one preferable application of the second motor controller, the second electrical angle determination unit carries out the determination of the electrical angle in the case where a rate of change of the required torque is not less than a predetermined value while the electric currents made to flow through the windings at the predetermined timing by the torque control unit are not less than the predetermined level.

The objects of the present invention are attained by a method of controlling a motor, as well as the motor controller discussed above.

The present invention is accordingly directed to a first method of regulating multi-phase alternating currents made to flow through windings, thereby controlling operation of a synchronous motor, which rotates a rotor by taking advantage of a revolving magnetic field generated in the windings in the course of the flow of the multi-phase alternating currents. The first method includes the steps of: (a) setting a required torque to be output from the motor; (b) applying a voltage for determination to the windings at a predetermined timing and determining an electrical angle of the rotor, based on a behavior of electric currents flowing through the windings in response to the applied voltage for determination; (c) estimating an electrical angle at each timing when control of the operation of the synchronous motor is carried out, based on the electrical angle determined in the step (b); (d) regulating the multi-phase alternating currents made to flow through the windings, according to the required torque and the estimated electrical angle; and (e) adjusting execution timings of the step (d) and the step (b), in order to avoid an effect of the electric currents made to flow through the windings in the step (d) on the determination of the electrical angle.

The present invention is also directed to a second method of regulating multi-phase alternating currents made to flow through windings, thereby controlling operation of a synchronous motor, which rotates a rotor by taking advantage of a revolving magnetic field generated in the windings in the course of the flow of the multi-phase alternating currents. The second method includes the steps of: (a) setting a required torque to be output from the motor; (b) applying a voltage for determination to the windings at a predetermined timing and determining an electrical angle, which defines an electrical position of the rotor, based on a behavior of electric currents flowing through the windings in response to the applied voltage for determination; (c) estimating an electrical angle at each timing when control of the operation of the synchronous motor is carried out, based on the electrical angle determined in the step (b); (d) regulating the multi-phase alternating currents made to flow through the windings according to the required torque and the estimated electrical angle, so as to enable output of the required torque; and (e) when the electric currents made to flow through the windings at the predetermined timing in the step (d) is not less than a predetermined level, carrying out the determination of the electrical angle in response to the voltage applied to the windings in the step (d), instead of the voltage for determination applied in the step (b).

The first method and the second method of controlling the motor exert the same effects as those of the first and the second motor controllers discussed above. Namely this arrangement enables the electrical angle of the motor to be determined adequately even under the condition of a varying required torque and executes the appropriate torque control. This ensures the stable operation of the motor and improves the driving efficiency of the motor.

These and other objects, features, aspects, and advantages of the present invention will become more apparent from the following detailed description of the preferred embodiments with the accompanying drawings.

BRIEF DESCRIPTION OF THE DRAWINGS

FIG. 21 is a graph showing a variation in motor current with a variation in torque.

DESCRIPTION OF THE PREFERRED EMBODIMENTS (1) Structure of Embodiment

Figure 1:
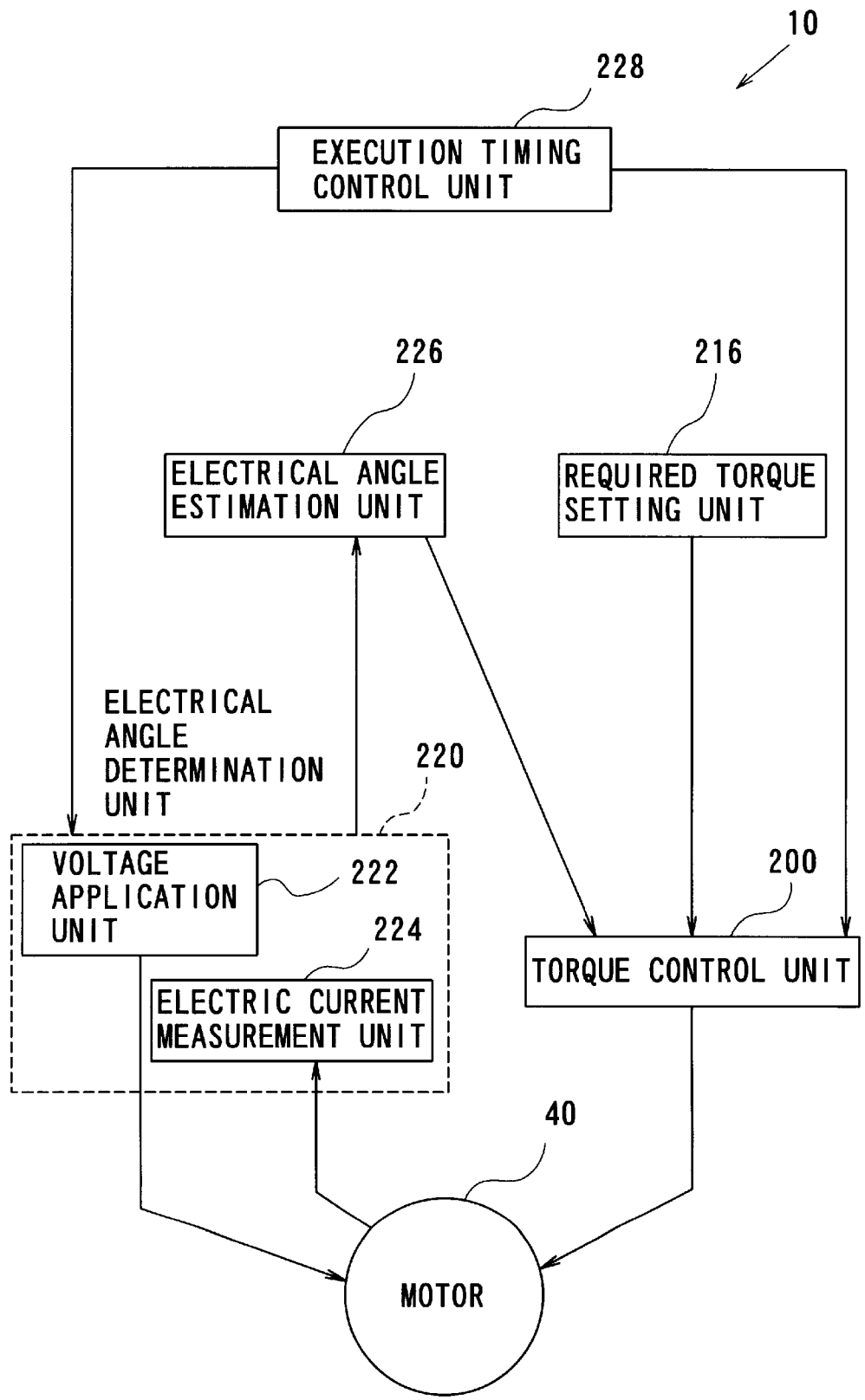
FIG. 1 is a block diagram illustrating a software configuration of a motor controller 10 in a first embodiment according to the present invention.

As illustrated in FIG. 1, the motor controller 10 for controlling operation of a motor 40 includes a required torque setting unit 216, a torque control unit 200, an electrical angle determination unit 220, an electrical angle estimation unit 226, and an execution timing control unit 228. The motor 40, which is an object to be controlled by the motor controller 10 is a synchronous motor that rotates by making multi-phase alternating currents flow through coil windings as discussed later.

The electrical angle determination unit 220 includes a voltage application unit 222 and an electric current measurement unit 224. The voltage application unit 222 applies a voltage pulse for determining the electrical angle of the motor 40 to the windings of the motor 40. The electric current measurement unit 224 measures the electric currents flowing through the windings in response to the applied voltage pulse for determination. The electrical angle determination unit 220 determines the electrical angle of the motor 40, based on the applied voltage pulse for determination and the observed electric currents. The electrical angle thus determined is transmitted to the electrical angle estimation unit 226. The electrical angle estimation unit 226 estimates the electrical angle required for execution of the torque control based on the electrical angle determined in the above manner and a revolving speed of the motor 40, and transmits the estimated electrical angle to the torque control unit 200.

The required torque setting unit 216 sets a required torque to be output from the motor 40. The required torque may be calculated in the required torque setting unit 216, or may be obtained as an input value from the outside of the motor controller 10. The torque control unit 200 receives the pieces of information representing the required torque and the electrical angle from the required torque setting unit 216 and the electrical angle estimation unit 226, and regulates the electric currents made to flow through the windings of the motor 40, thereby causes the motor 40 to be driven at a required revolving speed and the required torque. The executing timings of the electrical angle determination unit 220 and the torque control unit 200 are controlled by the execution timing control unit 228. The execution timing control unit 228 corresponds to the adjustment unit of the present invention.

Figure 2:
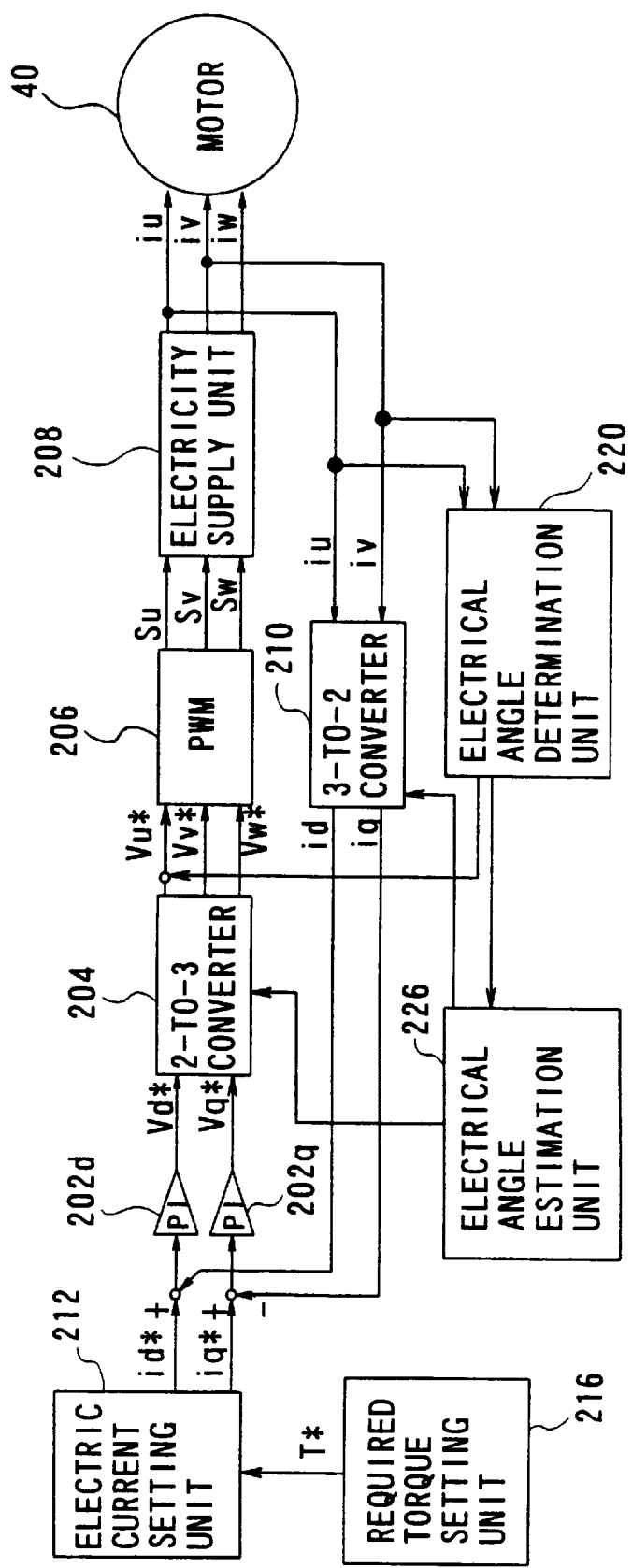
FIG. 2 is a block diagram illustrating the detailed structure of the software configuration including the electrical angle determination unit 220 and the torque control unit 200 in the motor controller 10.

FIG. 2 illustrates a detailed software configuration including the electrical angle determination unit 220 and the torque control unit 200. The structure of the torque control unit 200 is described first. A required torque T* set by the required torque setting unit 216 is transmitted to an electric current setting unit 212. The electric current setting unit 212 sets current command values id* and iq* based on the required torque T*. Here id* and iq* respectively denote command values of d-axis current and q-axis current in the motor 40. A concrete procedure refers to a map (not shown) to set the current command values.

A three phase-to-two phase converter 210 carries out three phase-to-two phase conversion of the electric currents flowing the respective phases U, V, and W of the motor 40, so as to calculate an electric current id flowing through the d axis and an electric current iq flowing through the q axis. In the example of FIG. 2, only the U-phase current iu and the V-phase current iv are used among the electric currents flowing through the respective phases U, V, and W. In the case of the three-phase alternating currents, the sum of the electric currents flowing through the U, V, and W phases is always equal to zero, so that it is not necessary to measure the electric current iw flowing through the W phase. The electrical angle estimated by the electrical angle estimation unit 226 is used for the three phase-to-two phase conversion.

PI control elements 202d and 202q carry out proportional-plus-integral control to set voltage command values Vd* and Vq* to be applied respectively to the d axis and the q axis, based on the differences between the current command values id* and iq* set in advance and the electric currents id and iq actually flowing. A two phase-to-three phase converter 204 then converts the preset voltage command values Vd* and Vq* into voltage command values Vu*, Vv*, and Vw* to be applied to the respective phases U, V, and W. The electrical angle estimated by the electrical angle estimation unit 226 is also used for the two phase-to-three phase conversion. A PWM (pulse width modulation) control unit 206 sets switching signals Su, Sv, and Sw for controlling the voltages applied to the respective phases, based on these command values. An electricity supply unit 208 causes electric currents to run through the respective phases by carrying out the switching operations in response to the switching signals.

In this embodiment, an inverter including switching elements is applied for the electricity supply unit 208 as discussed later. The PWM control unit 206 accordingly generates the switching signals to drive the electricity supply unit 208. In the case where the electricity supply unit 208 does not include any switching elements, the PWM control unit 206 may be omitted. Any control method other than the PWM control may be applied to generate the switching signals, as long as it can attain the voltage command values Vu*, Vv*, and Vw*.

The following describes the structure of the electrical angle determination unit 220. In the actual state, the structure of the electrical angle determination unit 220 partly overlaps the structure of the torque control unit 200. The electrical angle determination unit 220 outputs a voltage application signal for determination. This signal is output to be superposed upon one of the voltage command values corresponding to the respective phases U, V, and W set by the two phase-to-three phase converter 204, which is included in the torque control unit 200. In this embodiment, the application signal is superposed on the voltage command value of the U phase. The total voltage with the voltage for determination superposed thereon is applied to the motor 40 by means of the PWM control unit 206 and the electricity supply unit 208. The voltage for the torque output and the voltage for determination are accordingly applied in the superposed form to the motor 40. This is the arrangement of the voltage application unit 222 included in the electrical angle determination unit 220.

The electric currents flowing through the respective phases of the motor 40 are converted by sensors and transmitted to the electrical angle determination unit 220, prior to the two phase-to-three phase conversion. This arrangement corresponds to the electric current measurement unit 224. The electrical angle determination unit 220 determines the electrical angle based on the observed electric currents and the applied voltage for determination. The electrical angle thus determined is transmitted to the electrical angle estimation unit 226. The electrical angle estimation unit 226 corrects the electrical angle determined by the electrical angle determination unit 220 with a variation in electrical angle due to the rotation of the motor 40, thereby estimating the electrical angle required for the torque control.

Figure 3:
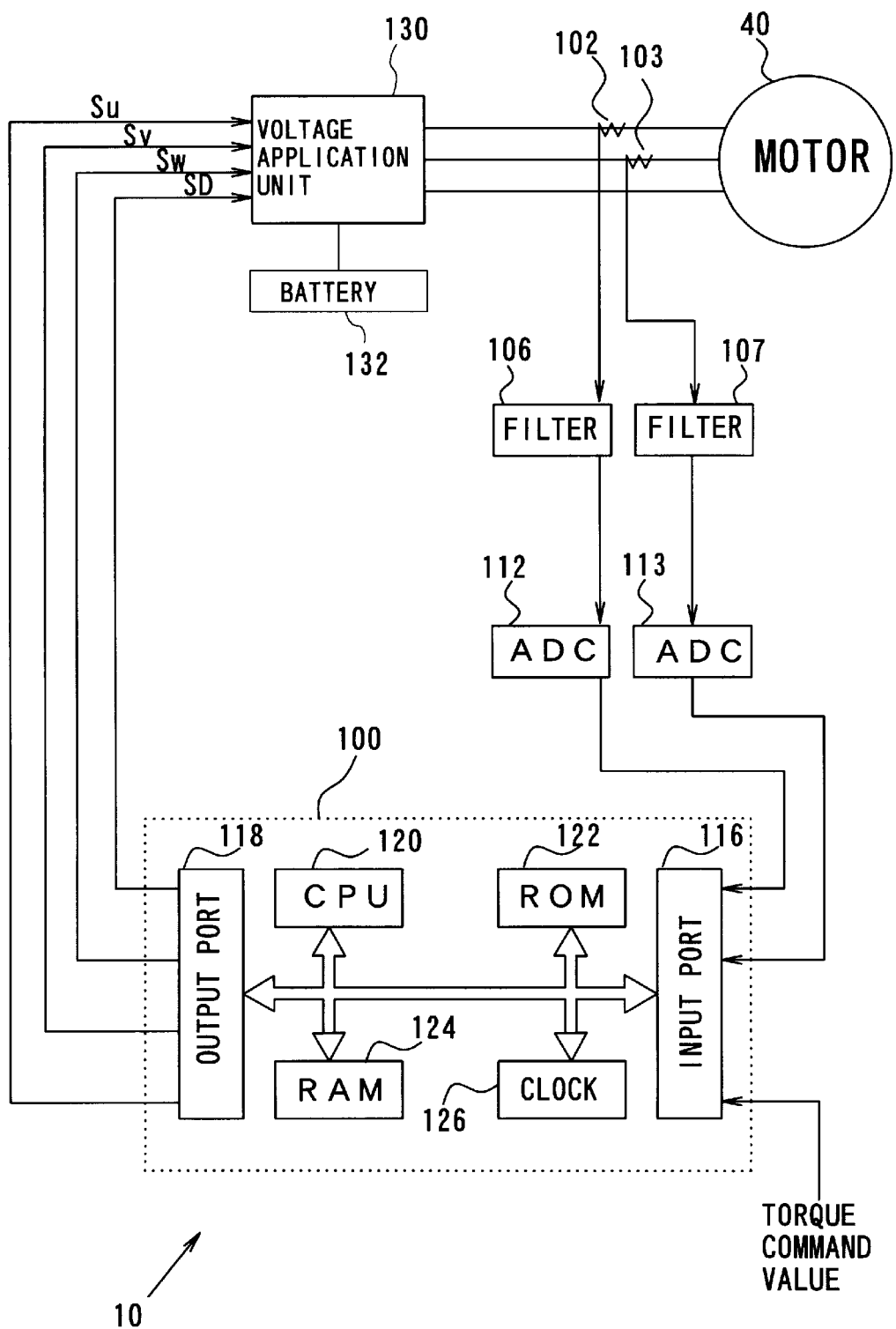
FIG. 3 is a block diagram schematically illustrating a hardware configuration of the motor controller 10.

The following describes a hardware configuration of the motor controller 10 of the embodiment and the motor 40. FIG. 3 illustrates the hardware structure of the motor controller 10 of this embodiment. The motor controller 10 includes a control ECU 100 that receives a torque command value mainly input from the outside and regulates the motor currents flowing through the three phases (U, V, and W phases) of the three-phase synchronous motor 40, current sensors 102 and 103 that measure the U-phase current iu and the V-phase current iv of the three-phase synchronous motor 40, filters 106 and 107 that remove high-frequency noises from the observed electric currents, and two analog-to-digital converters (ADC) 112 and 113 that convert the observed electric currents into digital data. A known electrical angle sensor using a Hall element is used in this embodiment.

As illustrated in FIG. 3, the control ECU 100 includes a microprocessor (CPU) 120 that executes arithmetic and logic operations, a ROM 122, in which a procedure of the processing executed by the CPU 120 and required data are stored, a RAM 124 which data required for the processing are temporarily written in and read from, and a clock 126 that counts the time. These elements are mutually connected via a bus. An input port 116 and an output port 118 are also connected to the bus. The CPU 120 reads the electric currents iu and iv flowing through the U, V, and W phases of the three-phase synchronous motor 40, the electrical angle θ, and the revolving speed N via these ports 116 and 118.

An inverter 130 and a battery 132, which apply a voltage between the respective coils of the motor 40 to obtain the phase currents iu, iv, and iw of the motor 40 determined according to the independently input torque command value, are connected to the output section of the control ECU 100. Control outputs Su, Sv, Sw, and SD are given from the CPU 120 to the inverter 130, in order to enable the voltage applied to each coil of the three-phase synchronous motor 40 to be regulated externally.

In this embodiment, a transistor inverter is applied for the inverter 130. The inverter 130 includes a pair of transistors for each phase functioning as the switching elements. One of the two transistors for each phase is connected to the source of the battery 132, while the other is connected to the sink of the battery 132. The control outputs Su, Sv, Sw, and SD from the control ECU 100 are input into the gates of these transistors, so as to control the ON-OFF state of the respective transistors. Inversion of the control outputs, whose high and low levels are inverted by inverter elements, are input into the transistors disposed at the sink of the respective phases. In general, the transistors of each phase on the source side and the sink side in the inverter are exclusively turned ON and OFF. The control signal SD is a shutdown signal to set all the transistors in the OFF position.

The control ECU 100 shown in FIG. 3 performs the functions of the torque control unit 200, the electrical angle determination unit 220, the required torque setting unit 216, the electrical angle estimation unit 226, and the execution timing control unit 228 shown in FIG. 1. The control ECU 100 also performs the functions of the respective blocks shown in FIG. 2 as the constituents of the torque control unit 200. In this embodiment, the required torque setting unit 216 has the function of setting the externally input torque command value to the required torque T*. The inverter 130 and the battery 132 perform the function of the electricity supply unit 208.

Figure 4:
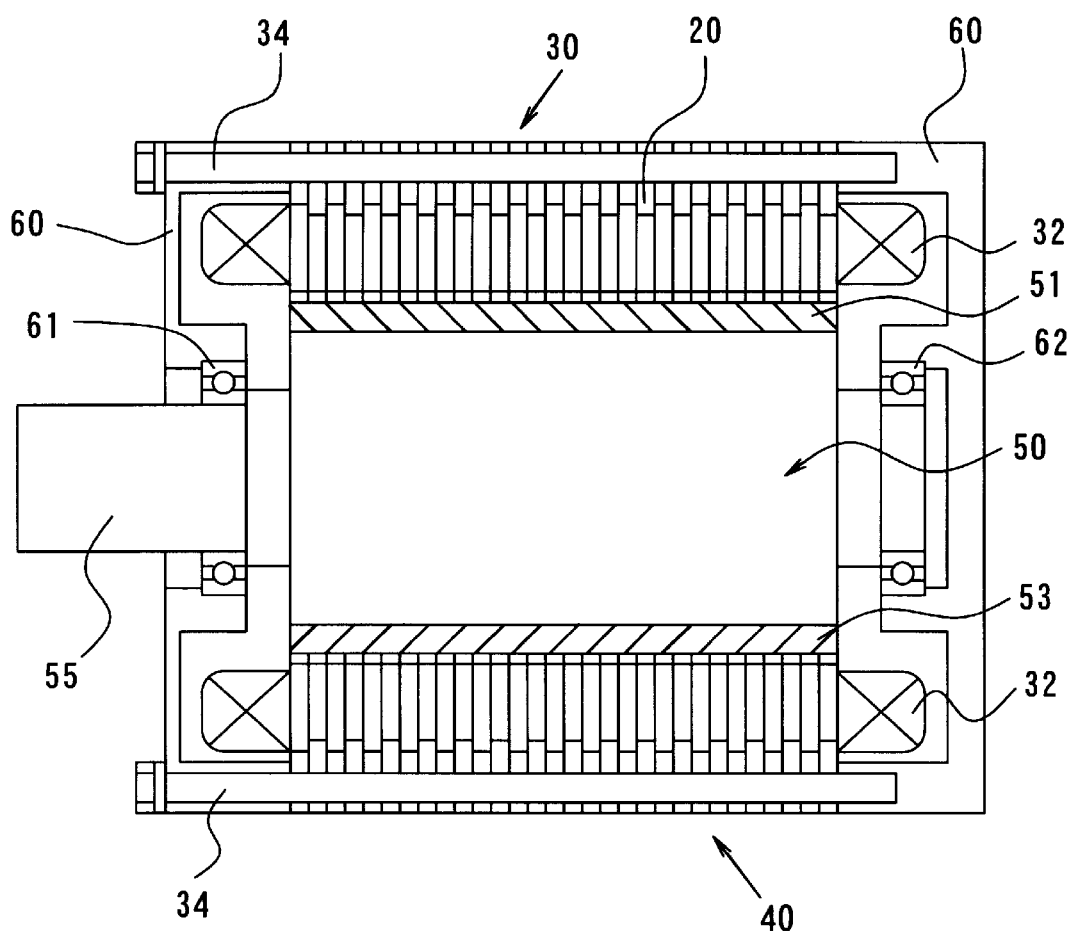
FIG. 4 schematically illustrates the structure of a three-phase synchronous motor 40.
Figure 5:
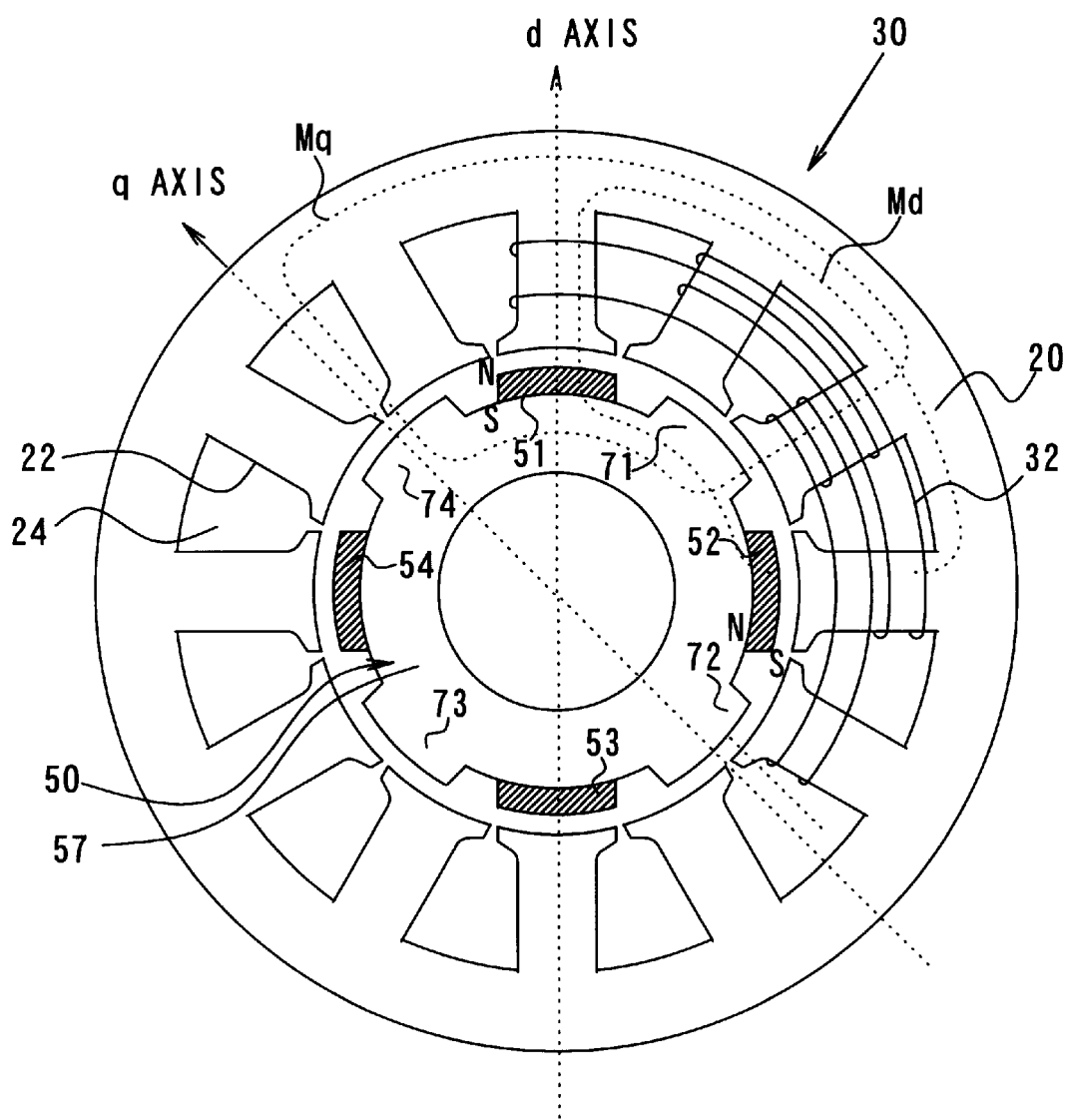
FIG. 5 is an end view illustrating the relationship between the stator 30 and the rotor 50 in the three-phase synchronous motor 40.

The following describes the structure of the motor 40, which is an object to be controlled by the motor controller of this embodiment. FIG. 4 is a sectional view illustrating a cross section including a rotating shaft 55 of the motor 40. FIG. 5 is a sectional view illustrating a cross section perpendicular to the rotating shaft 55. As clearly shown in FIG. 4, the three-phase synchronous motor 40 includes a stator 30, a rotor 50, and a casing 60 for accommodating the stator 30 and the rotor 50 therein. The rotor 50 has permanent magnets 51 through 54 attached to the outer circumferential thereof. The rotating shaft 55 arranged on the axial center of the rotor 50 is rotatably supported by bearings 61 and 62 set in the casing 60.

The rotor 50 is prepared by laying a plurality of plate-like rotor elements 57, which are punched out of a thin plate of non-directional electromagnetic steel, one upon another. Each plate-like rotor element 57 has four salient poles 71 through 74 arranged at the interval of 90 degrees as shown in FIG. 5. The rotating shaft 55 is pressed into the laminate of the plate-like rotor elements 57 to tentatively fix the laminate. The plate-like rotor element 57 composed of the electromagnetic steel plate has an insulating layer and an adhesive layer formed on the surface thereof. The laminate of the plate-like rotor elements 57 is heated to a predetermined temperature and fixed through the fusion of the adhesive layers.

After the rotor 50 is formed, the permanent magnets 51 through 54 are bonded to the outer circumferential face of the rotor 50 to be arranged between the salient poles 71 through 74 along the axial direction. The permanent magnets 51 through 54 are magnetized in the radial direction of the rotor 50 in such a manner that the adjoining magnets have different polarities. For example, the permanent magnet 51 has the N pole on the outer circumferential face, whereas the adjoining permanent magnet 52 has the S pole on the outer circumferential face. When the rotor 50 is combined with the stator 30, the permanent magnets 51 and 52 form a magnetic path Md that runs through the plate-like rotor elements 57 and plate-like stator elements 20 (see the broken line in FIG. 5).

The plate-like stator elements 20, which are laid one upon another to constitute the stator 30, are punched out of a thin plate of non-directional electromagnetic steel, like the plate-like rotor elements 57. Each plate-like stator element 20 has twelve teeth 22 as shown in FIG. 5. Coils 32 are wound on slots 24 formed between the respective adjoining teeth 22 to generate a revolving magnetic field in the stator 30. Although being omitted from FIG. 5, bolt holes, in which fixation bolts 34 are fitted, are perforated in the peripheral portions of the plate-like stator elements 20.

The stator 30 is tentatively fixed by heating and fusing the adhesive layers while the laminate of the plate-like stator elements 20 is under pressure. The coils 32 are wound on the teeth 22 in this state, to so as complete the stator 30. The complete stator 30 is set in the casing 60, and the fixation bolts 34 are fitted in the bolt holes to fasten the assembly. The rotor 50 is then rotatably combined with the assembly via the bearings 61 and 62 in the casing 60. This completes the three-phase synchronous motor 40.

When an exciting current is flown through the coils 32 of the stator 30 to generate a revolving magnetic field, a magnetic path Mq is formed to run through the adjoining salient poles, the plate-like rotor elements 57, and the plate-like stator elements 20 as shown by the broken line in FIG. 5. The axis 'd' represents the axis, which the magnetic flux formed by the permanent magnet 51 passes on the center of the axis of rotation and through the rotor 50 in the radial direction, whereas the axis 'q' represents the axis electrically perpendicular to the d axis in the surface of revolution of the rotor 50. Namely the d axis and the q axis rotate with the rotation of the rotor 50. In this embodiment, the outer circumferential faces of the permanent magnets 51 and 53 attached to the rotor 50 form N poles, whereas the outer circumferential faces of the permanent magnets 52 and 54 form S poles. The geometrical angle of the d axis and the q axis is accordingly 45 degrees as shown in FIG. 5.

Figure 6:
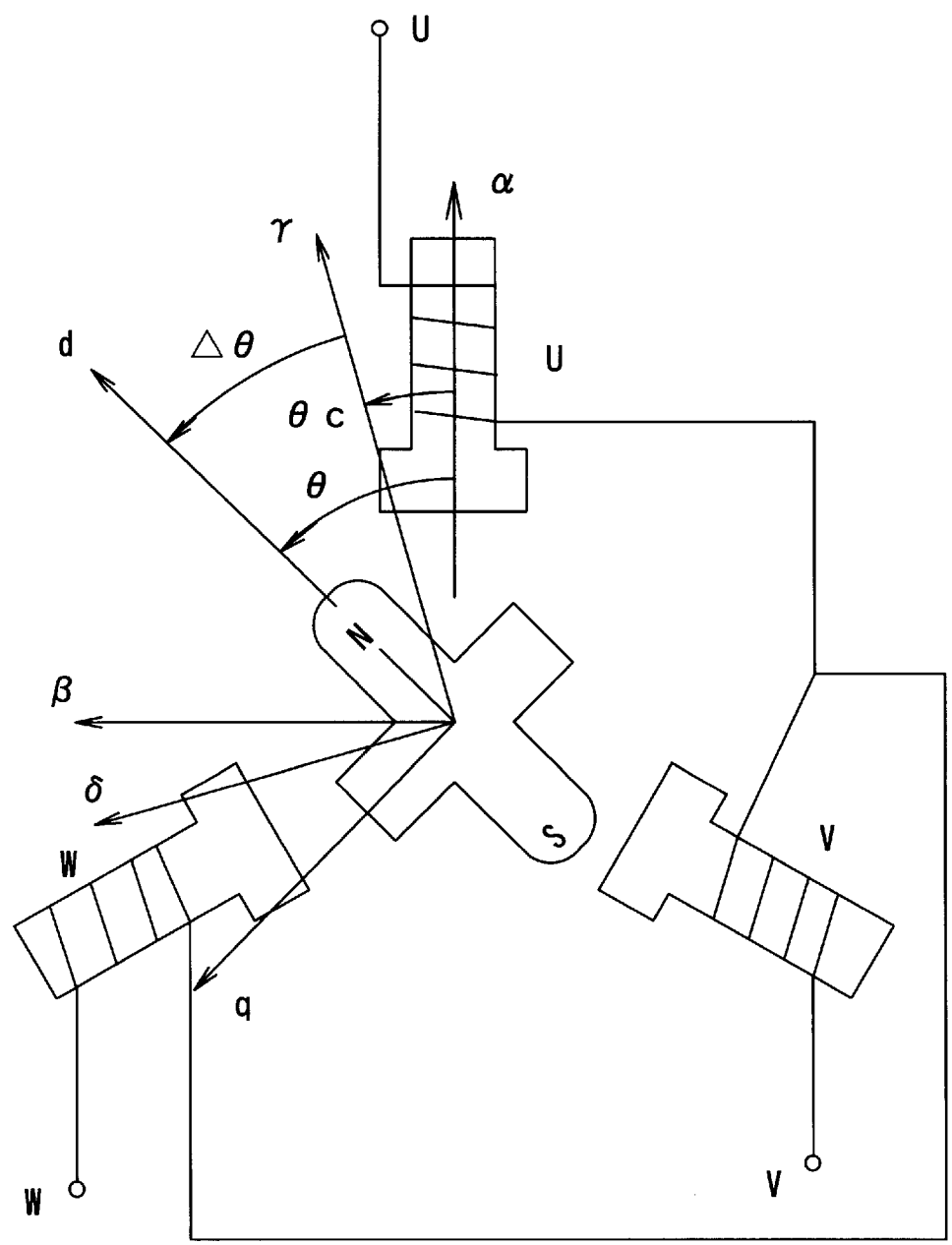
FIG. 6 is an equivalent circuit diagram of the three-phase synchronous motor 40.

FIG. 6 shows an equivalent circuit of the three-phase synchronous motor 40 of this embodiment. The three-phase synchronous motor 40 is expressed by an equivalent circuit including three-phase (U, V, and W phases) coils and a permanent magnet rotating about an axis of rotation. In the equivalent circuit, the d axis is defined as the axis that passes through the N pole of the permanent magnet as the positive direction. The electrical angle is given as a rotational angle θ of the axis that passes through the U-phase coil and the d axis.

(2) Operation Control

Figure 7:
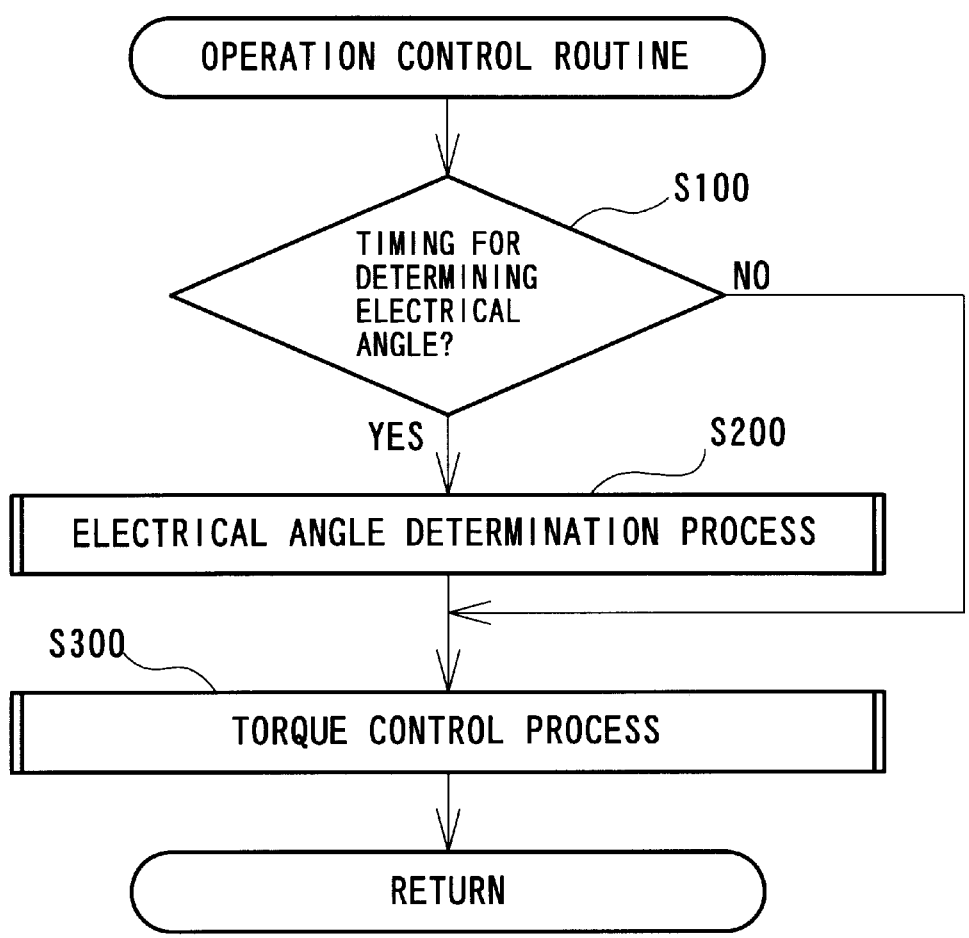
FIG. 7 is a flowchart showing an operation control routine executed in the first embodiment.

The motor controller 10 of this embodiment carries out the operation control of the motor 40. FIG. 7 is a flowchart showing an operation control routine. This routine is executed periodically by the CPU 120 in the control ECU 100.

When the program enters the operation control routine, the CPU 120 first determines whether or not it is a timing for determining the electrical angle at step S100. In this embodiment, a torque control process is carried out at smaller intervals, whereas an electrical angle determination process is carried out at greater intervals as discussed later. The torque control process sets the electric currents to flow through the coils in response to the required torque of the motor 40 and makes the preset electric currents to actually flow through the coils. In this embodiment, there is a difference in execution interval between the electrical angle determination process and the torque control process, in order to ensure the smooth control of the operation of the motor 40. For the control of the operation of the motor 40, it is required to regulate the switching operations of the inverter according to the rotation of the motor 40 and thereby generate a revolving magnetic field. The torque control process to implement such regulation should be carried out at sufficiently small intervals to follow a variation in rotation of the motor 40. The torque control process requires the value of the electrical angle. If the revolving speed of the motor 40 is known, the rotational angle per unit time can be determined. This enables the electrical angle to be estimated by integration.

The electrical angle determination process, on the other hand, determines the electrical angle and cancels the accumulated error of the electrical angle estimated by integration. It is accordingly sufficient that the electrical angle determination process is carried out at greater intervals than the torque control process. In the case where the electrical angle determination process can be carried out at the rate following a variation in rotation of the motor 40, the determination of the electrical angle may be carried out on every execution of the operation control routine. In this case, the decision of step S100 is not required and is omitted.

In this embodiment, the electrical angle determination process is carried out after the operation control routine is executed a preset number of times. The CPU 120 refers to a memory, in which information representing the count of the execution times of the operation control routine is stored, and determines whether or not it is a timing for executing the electrical angle determination process. When determining that it is the timing of executing the electrical angle determination process, the program carries out the electrical angle determination process at step S200. When determining that it is not yet the timing of executing the electrical angle determination process, on the contrary, the program skips the electrical angle determination process.

Figure 8:
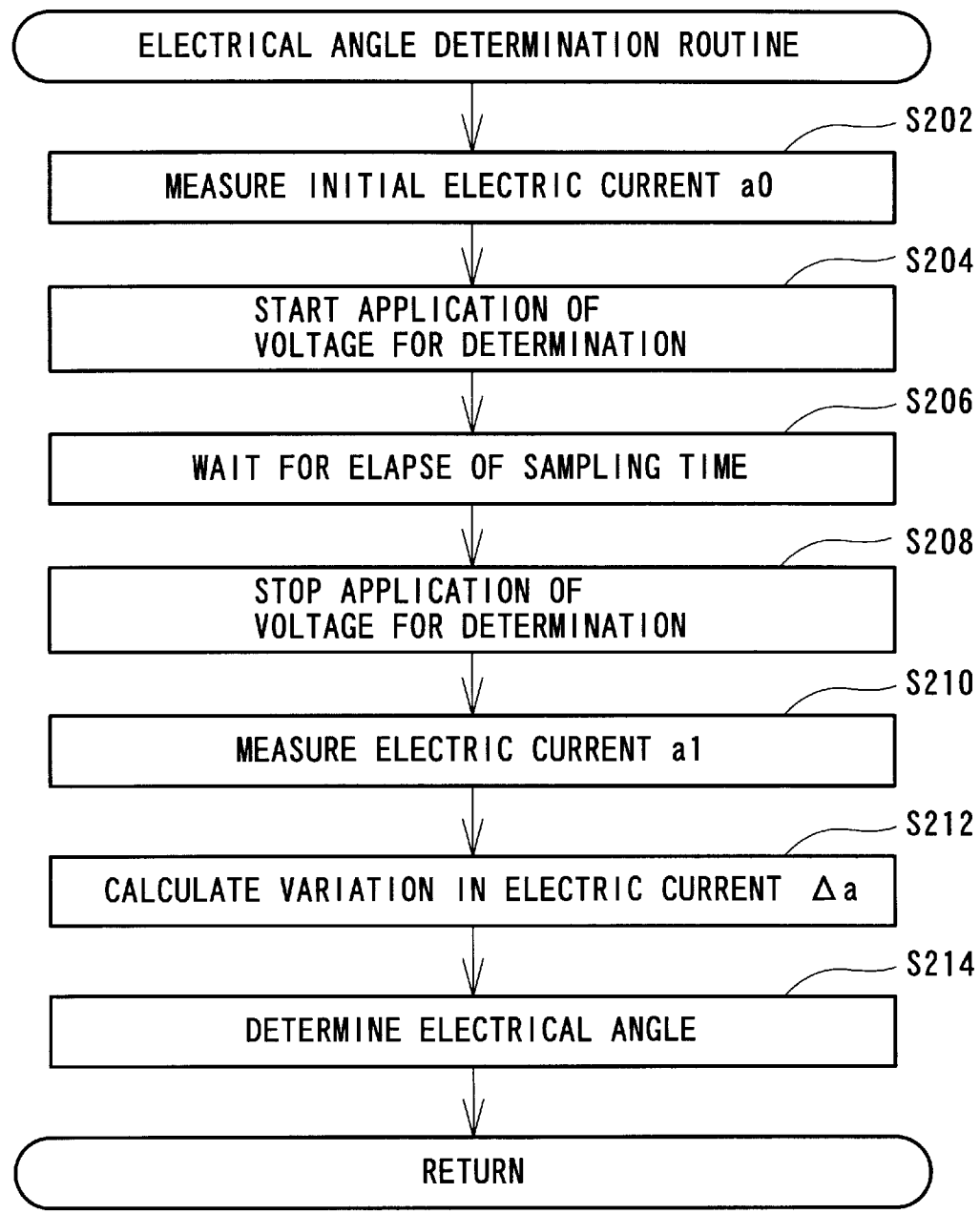
FIG. 8 is a flowchart showing the details of the electrical angle determination process executed at step S200 in the flowchart of FIG. 7.
Figure 9:
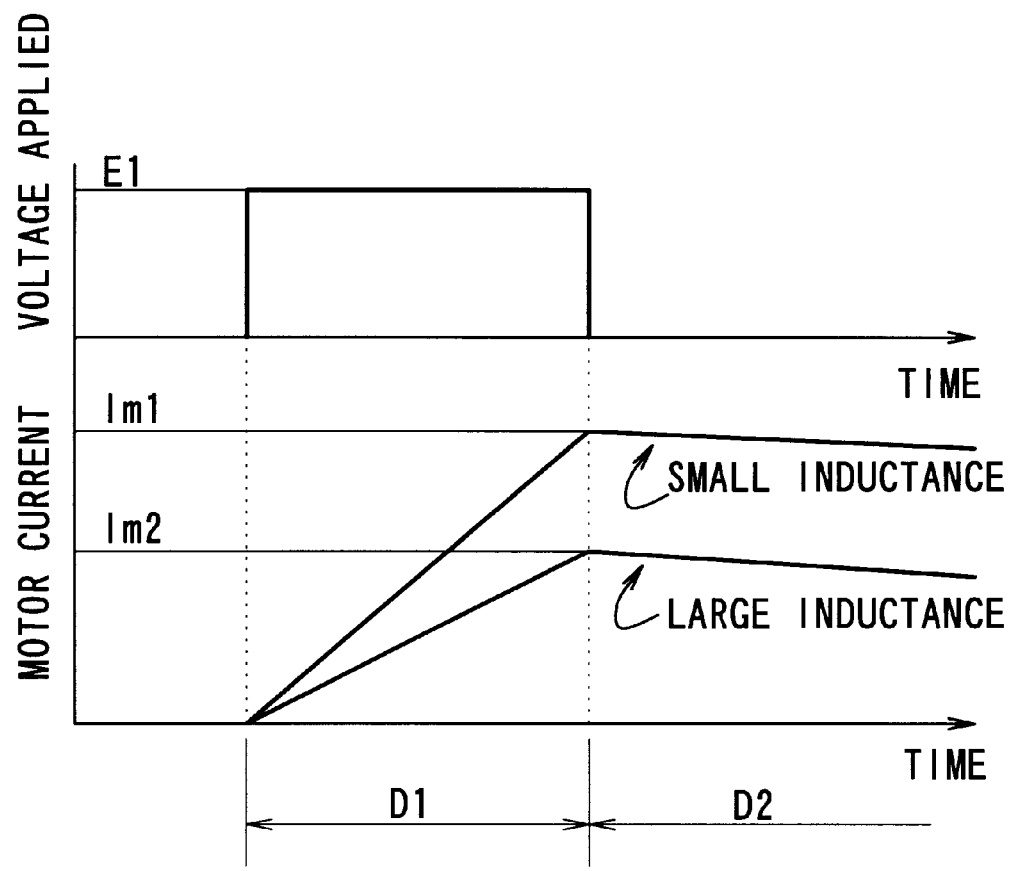
FIG. 9 shows the principle of the electrical angle determination.

The flowchart of FIG. 8 shows the details of the electrical angle determination process. The graph of FIG. 9 shows variations in voltage and electric current in the course of the execution of this process. The principle of the electrical angle determination is described first with the graph of FIG. 9.

When a predetermined voltage E1 for determination is applied in the form of a step function between the U phase and the V-W phase in the equivalent circuit of the three-phase synchronous motor 40 shown in FIG. 6, an electric current Au flowing in the equivalent circuit shows a transient response, which depends upon an inductance L of the circuit. The voltage E1 is applied in a specific direction that makes the U phase in the positive state and the other phases in the negative state. The graph of FIG. 9 shows an example of the transient response when the voltage E1 is applied. The inductance L of the circuit is a function of the electrical angle θ of the rotor 50 at that moment. On the assumption that the rotor 50 is not rotated (that is, in the stationary state), the inductance L of the circuit depends upon the angle of the d axis of the rotor 50 with respect to the q axis (electrical angle). In this embodiment, the observed relationship between the inductance L of the circuit and the electrical angle is stored in the form of a table in the ROM 122.

An electric current Au(t1) flowing in the equivalent circuit shown in FIG. 5 (hereinafter referred to as the U-phase current) shows a response defined by Equation (1) given below during the application of the voltage, that is, in a district D1 of FIG. 9:

$$Au(t1) = \{1 - \exp(-R \cdot t1/L)\} E1/R \quad (1)$$

where exp represents an exponential function, R denotes an impedance of the circuit, t1 denotes an elapse of time since the start of voltage application, and L/R is equal to a time constant Tm of the motor.

According to Equation (1), the response of the electric current is expressed by a curve, strictly speaking. In this embodiment, however, since the time period of voltage application t1 is sufficiently smaller than the time constant Tm of the motor, the variation in electric current can be approximated by a straight line as shown in FIG. 9. Upon condition that the time period of voltage application t1 is sufficiently smaller than the time constant Tm of the motor, Equation (1) is subjected to Taylor's expansion and rewritten as Equation (2) given below:

$$Au(t1)=E1 \cdot t1/L \qquad (2)$$

According to Equation (1) or Equation (2), it is understood that the behavior of the electric current Au(t1) on the application of the voltage varies with a variation in inductance L. In the case of the small inductance, the motor current rises to a first value of electric current Im1 at the end of the time period of voltage application as shown in FIG. 9. In the case of the large inductance, on the contrary, the motor current rises only to a second value of electric current Im2, which is smaller than the first value of electric current Im1.

The procedure of this embodiment takes into account such characteristics and measures a variation in motor current before and after the start of the voltage application. The procedure then calculates the inductance L by substituting the observed current and the other known values into Equation (2). As discussed previously, the relationship between the inductance L and the electrical angle is stored in the form of a table in the ROM 122. The electrical angle determination process of this embodiment refers to this table and reads the electrical angle corresponding to the calculated inductance L. In the above description, the inductance L is calculated from the variations in electric current Im1 and Im2 before and after the start of voltage application. One modified procedure may calculate the inductance L from a required time period when the electric current Au reaches a predetermined value. Another modified procedure uses a rate of change of the electric current during the application of the voltage (in the district D1 of FIG. 9). When Equation (2) is used for the calculation of the inductance L, it is necessary that both the time period when a voltage is actually applied to the circuit and the value of the voltage are known.

The electrical angle determination routine shown in the flowchart of FIG. 8 is carried out to determine the electrical angle base don this principle discussed above. When the program enters the routine, the CPU 120 first measures an initial current value a0 at step S202. A concrete procedure of the measurement reads a signal, which is output from the current sensor 102 in response to the electric current flowing through the U phase, from the input port 116 via the filter 106 and the ADC 112. The CPU 120 then starts application of the voltage for determination at step S204. A concrete procedure of step S204 outputs a High level of the signal Su that regulates the U-phase current to the inverter 130. The pattern of the voltage application is shown in the graph of FIG. 9. This results in making the motor current flown through the U phase corresponding to the voltage for determination as shown in the graph of FIG. 9.

The CPU 120 then waits for elapse of a sampling time at step S206. The sampling time corresponds to the time period of the district D1 in the graph of FIG. 9. In the actual procedure, the CPU 120 periodically gives an interruption according to a variety of control routines of the motor 40 and thereby carries out the electrical angle determination routine. The sampling time here thus represents the timing expressed as an integral multiple of the interruption cycle. In this embodiment, the interruption is given after a fixed time period has elapsed. In the case where the elapse of the time period from the start of application of a voltage in the normal direction to the measurement of the electric current is specified, the timing that may not be a fixed time interval, such as the timing when one package of tasks is concluded, may be set to the sampling time.

After the elapse of the sampling time, the CPU 120 stops the application of the voltage in the normal direction at step S208 and measures an electric current al at step S210. The measurement of the electric current and the stop of the voltage application may be carried out in the reverse sequence. The value of the electric current is kept for some time after the stop of the voltage application as clearly seen from the graph of FIG. 9. The electric current al may accordingly be measured when a certain time period, which ensures non-attenuation of the electric current, has elapsed since the stop of the voltage application. At subsequent step S212, the CPU 120 calculates a variation in electric current Δa1 (=a1−a0) before and after the application of the voltage in the normal direction, from the observed values of electric current a0 and a1 obtained at steps S202 and S210.

The CPU 120 then determines the electrical angle based on this result at step S214. A concrete procedure of step S214 calculates the inductance L according to Equation (2) given above and refers to the table representing the relationship between the electrical angle and the inductance, so as to determine the electrical angle. After the determination of the electrical angle, the CPU 120 exits from the electrical angle determination routine.

According to the format of the table representing the relationship between the electrical angle and the inductance, the simple measurement of the U-phase current may not unequivocally determine the electrical angle in the range of 0 to 2 π. In such cases, the electrical angle determination routine of FIG. 8 is also carried out for the V phase to determine the electrical angle. The method then compares the electrical angle based on the U-phase current with the electrical angle based on the V-phase current, so as to determine the electrical angle unequivocally in the range of 0 to 2 π. After the determination of the electrical angle, the CPU 120 returns to the operation control routine shown in the flowchart of FIG. 7.

Figure 10:
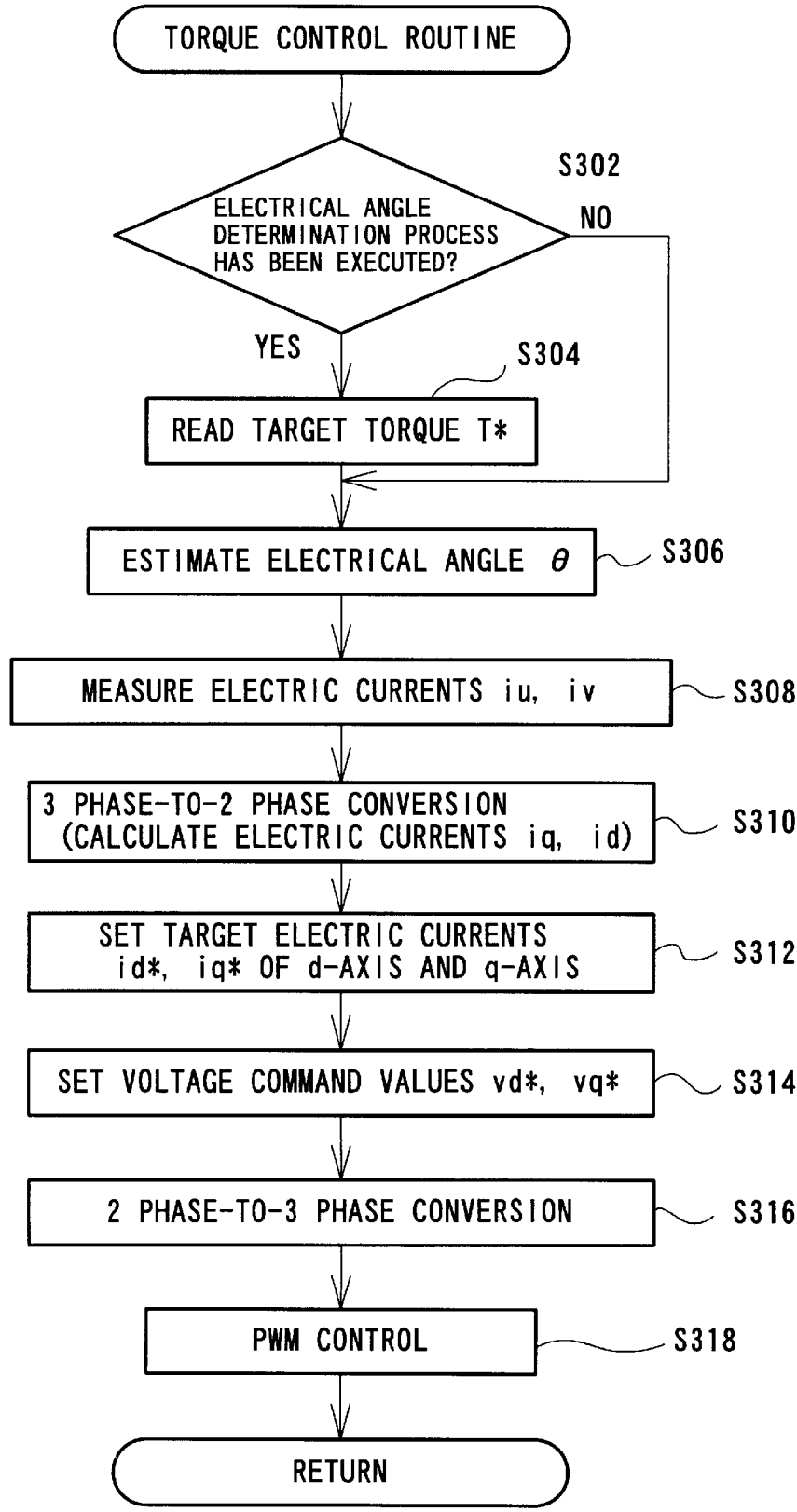
FIG. 10 is a flowchart showing the details of the torque control process executed at step S300 in the flowchart of FIG. 7.

The CPU 120 then carries out the torque control process at step S300 in the flowchart of FIG. 7. The details of the torque control process are described with the flowchart of FIG. 10. When the program enters the torque control routine of FIG. 10, it is first determined whether or not the electrical angle determination process is carried out at step S302. In this embodiment, the method of determining the execution timing of the electrical angle determination process is applied to determine whether or not the electrical angle determination process is carried out. Another available procedure uses a flag representing the execution or non-execution of the electrical angle determination process and carries out the determination of step S302 based on the flag.

In the case where the electrical angle determination process has been executed, the CPU 120 reads a target torque or torque command value T* at step S304. Otherwise the CPU 120 skips the processing of step S304. This enables a change of the torque command value T* for the torque control of the motor 40 only when the torque control routine is carried out immediately after the execution of the electrical angle determination process. Otherwise the torque control of the motor 40 is based on the torque command value T* read in the previous cycle of this routine.

The CPU 120 then estimates the electrical angle θ at step S306. The following procedure is applied for the estimation of the electrical angle θ. For convenience of explanation, the electrical angle determined by the electrical angle determination process is referred to as $θ_0$, and the electrical angle estimated at step S306 as θ. In the case where this cycle of the torque control routine is immediately after the execution of the electrical angle determination process, the electrical angle θ0 determined by the process is set to the electrical angle θ; that is, $θ=θ_0$. Otherwise the electrical angle θ is estimated from the electrical angle $θ_0$ determined by the electrical angle determination process by taking into account a change of the angle due to the rotation of the motor 40. The change of the angle due to the rotation of the motor 40 is expressed as the product of a rotational angular velocity ω and a time period tp elapsing since the execution of the electrical angle determination process. The method accordingly calculates the electrical angle θ according to the equation of $θ=θ_0+ω×tp$.

Namely the concrete procedure of the estimation of the electrical angle at step S306 calculates the electrical angle θ according to one of the above equations. The electrical angle calculated here may, however, include an error in every cycle of the torque control routine. The electrical angle determined by the electrical angle determination process shown in the flowchart of FIG. 8, on the other hand, has little error. This specification refers to the processing of step S306 as 'estimation', in order to differentiate from the determination with the high accuracy.

The CPU 120 then measures the electric currents iu and iv with the current sensors 102 and 103 at step S308. The electric current flowing through the W phase is not measured here, since the sum of the electric currents flowing through the U, V, and W phases is always equal to zero in the case of the three-phase alternating currents and the electric current of the W-phase can be calculated from the observed electric currents iu and iv. The CPU 120 subsequently carries out the three phase-to-two phase conversion based of the observed electric currents iu and iv and the estimated electrical angle θ, so as to calculate a d-axis current id and a q-axis current iq at step S310. The following equations are used for the three phase-to-two phase conversion:

$id=\sqrt{2}×(-iu. \sin (θ-120)+iv. \sin θ)$ $iq=\sqrt{2}×(-iu. \cos (θ-120)+iv. \cos θ)$ The d-axis current id and the q-axis current iq thus calculated are used to set voltage command values as described below. The d-axis current and the q-axis current are essential parameters in the torque control of the motor. The method of this embodiment accordingly carries out the conversion into the d-axis current and the q-axis current to implement the torque control. Another possible procedure carries out the torque control based on the electric currents of the U, V, and W phases without any conversion.

At subsequent step S312, the CPU 120 sets target electric currents id* and iq* of the d axis and the q axis based on the target torque T*. A concrete procedure of step S312 reads values of target electric currents corresponding to the target torque T* from an electric current map stored in the ROM 122. The electric current map gives the target electric currents id* and iq* corresponding to discrete values of the target torque T*. There is a possibility that the corresponding values are not present in the map according to the value of the target torque T*. In such cases, the method of this embodiment carries out the linear interpolation of the electric current map to determine the corresponding values. In the case where the discrete values of the torque are set at sufficiently small intervals in the map, a procedure other than the interpolation may be applied. One exemplified procedure selects a point corresponding to the target torque T* among the discrete points in the map and reads the target electric currents id* and iq* corresponding to the selected point.

After setting the target electric currents id* and iq*, the CPU 120 sets voltage command values Vd* and Vq* to be applied in the d-axis direction and the q-axis direction at step S314. The proportional-plus-integral control (PI control) is applied to set these voltage command values Vd* and Vq*. A concrete procedure calculates differences Δid and Δiq between the d-axis current id and the q-axis current iq calculated at step S310 and the target electric currents id* and iq* set at step S312 and sets the sums of the proportional terms and the integral terms of the differences Δid and Δiq to the voltage command values Vd* and Vq*. The proportional-plus-integral control is a known control method and not described in detail here.

The above procedure sets the voltage command values Vd* and Vq* applied to the d axis and the q axis. The CPU 120 then carries out the two phase-to-three phase conversion and converts these voltage command values Vd* and Vq* into voltage command values Vu*, Vv*, and Vw* to be applied to the U, V, and W phases at step S316. The following equations are used for the two phase-to-three phase conversion:

$Vu^*=\sqrt{(2/3)}×(Vd^*. \cos θ-Vq^*. \sin θ)$ $Vv^*=\sqrt{(2/3)}×(Vd^*. \cos (θ-120)-Vq^*. \sin (θ-120))$ $Vw^*=-Vu-Vv$ The CPU 120 outputs the results of the two phase-to-three phase conversion to the inverter 130 for the PWM control at step S318. A concrete procedure of step S318 converts the voltage command values Vu*, Vv*, and Vw* of the respective phases into duty ratios of ON/OFF signals and outputs the ON/OFF signals to the respective transistors included in the inverter 130. When the respective transistors included in the inverter 130 are set in the ON position and in the OFF position in response to the ON/OFF signals, the target electric currents id* and iq* set at step S312 flow through the d axis and the q axis, so that the motor 40 outputs a torque corresponding to the target torque T*. The motor controller of this embodiment periodically repeats this control procedure to control the operation of the motor 40.

Figure 11:
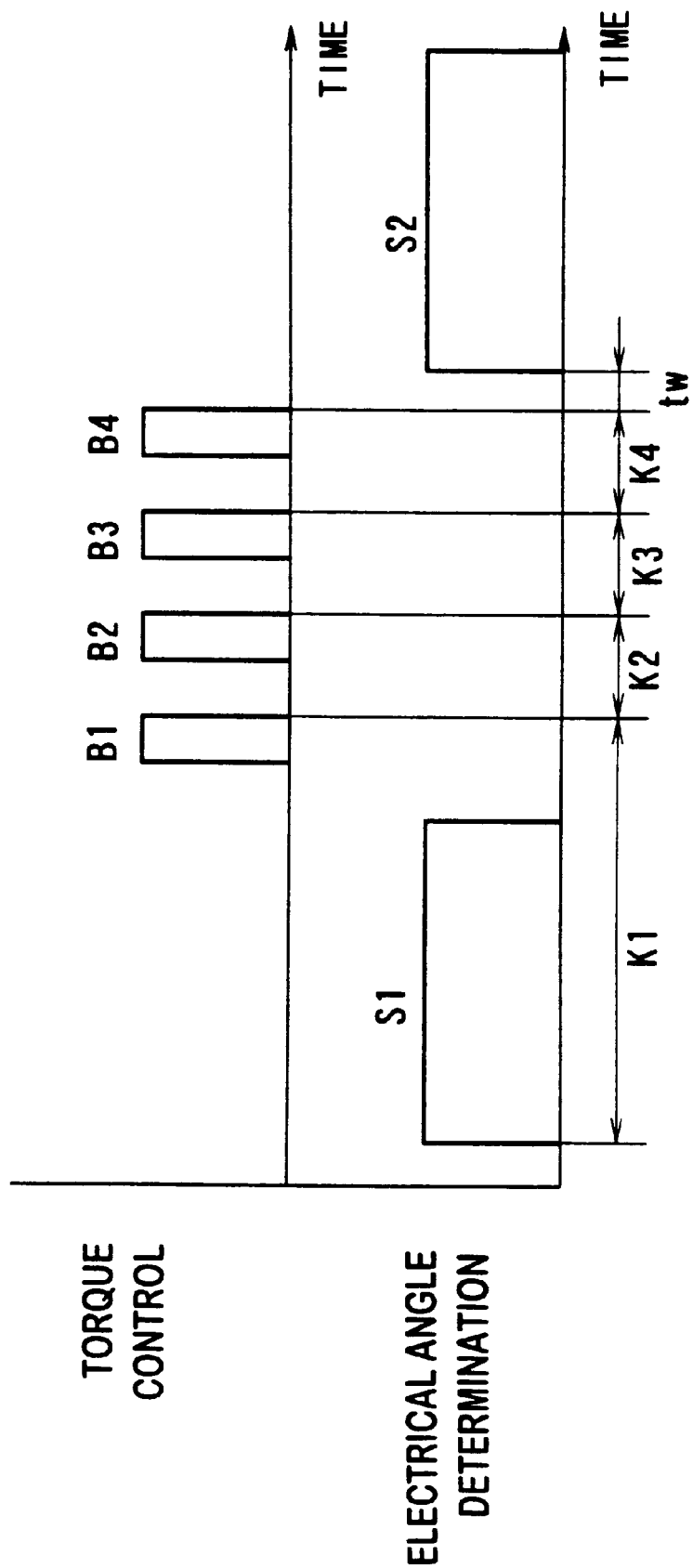
FIG. 11 shows the execution timings of the electrical angle determination process and the torque control process in the first embodiment.

FIG. 11 shows execution timings of the electrical angle determination process and the torque control process when the operation control routine discussed above is carried out. B1, B2, B3, and B4 in FIG. 11 represent the timings of executing the torque control process, whereas S1 and S2 represent the timings of executing the electrical angle determination process. In the example of FIG. 11, the electrical angle determination process is carried out once after the torque control process is repeated four times. K1, K2, K3, and K4 in FIG. 11 represent the divisions or time periods when the operation control routine is carried out.

As clearly understood from FIG. 11, the division K1 is determined to correspond to the timing of executing the electrical angle determination process, so that both the electrical angle determination process at the timing S1 and the torque control process at the timing B1 are carried out in the division K1. The subsequent divisions K2 through K4 are determined not to correspond to the timing of executing the electrical angle determination process, so that only the torque control process is carried out at the timings B2 through B4 in these divisions K2 through K4. A subsequent division after the division K4 is again determined to correspond to the timing of executing the electrical angle determination process, so that both the electrical angle determination process at the timing S2 and the torque control process are carried out in the subsequent division. As described previously at steps S302 and S304 in the torque control routine of FIG. 10, the target torque T* is updated only when the torque control process is carried out immediately after the execution of the electrical angle determination process. In the example of FIG. 11, the target torque T* is updated only in the torque control process executed at the timing B1. The torque control process is carried out at the timings B2 through B4 with the target torque T*, which has been updated at the timing B1.

Figure 12:
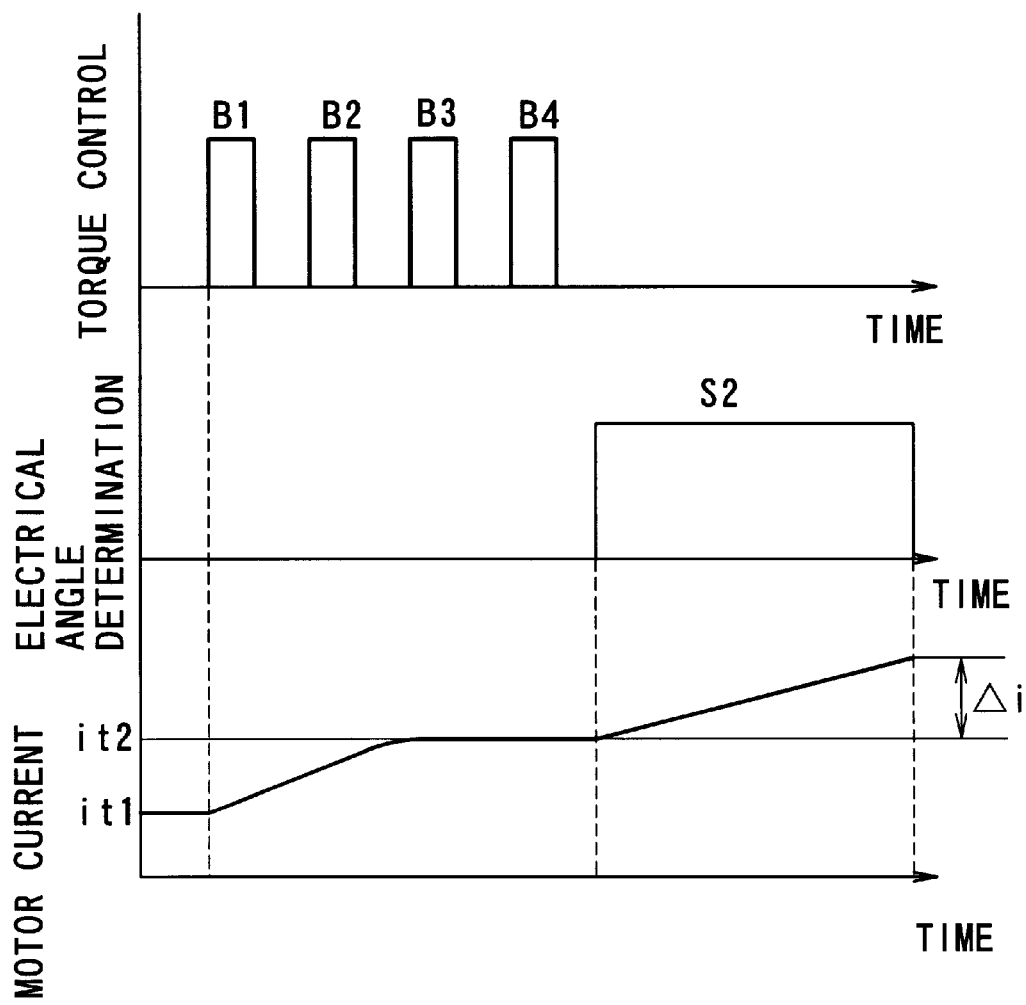
FIG. 12 is a graph showing a variation in motor current in the course of the control operation following the procedure of the first embodiment.

The graph of FIG. 12 shows a variation in electric current when the electrical angle determination process and the torque control process are carried out at the timings discussed above. In the graph of FIG. 12, the variation in motor current is plotted against a time period between the timing B1 of the torque control process and the timing S2 of the electrical angle determination process. It is here assumed that the target torque T* has been updated to a greater value in the torque control process at the timing B1. The current command value of the motor 40 increases from a value it1 before the update of the target torque T* to a greater value it2 after the update of the target torque T*. The torque control process at the timing B1 controls the switching operations of the transistors included in the inverter 130 to flow the increasing electric current. In the actual state, a longer time than one execution cycle of the torque control process is required to increase the motor current. The motor current accordingly reaches the target value it2 and becomes constant in the torque control process at the timing B2 or the timing B3. This is only an example. According to the characteristics of the motor 40, the motor current may reach the target value it2 during the execution of the torque control process at the timing B1.

The arrangement of newly inputting the target torque T* only immediately after the electrical angle determination process enables the motor current to be stabilized at the new target value it2 in the next cycle of the electrical angle determination process. The variation in electric current $\Delta i$ observed in the electrical angle determination process at the timing S2 is only a change in response to the applied voltage for determination as shown in FIG. 12. This arrangement accordingly enables the electrical angle to be determined appropriately.

The arrangement of setting the execution timings of the torque control process and the electrical angle determination process like motor controller of this embodiment prevents the torque control from being carried out in the course of the electrical angle determination. Even in the transient state where the electric current flowing through the coils in the motor 40 shifts to the new target value it2, the motor current is not increased but is kept at a substantially fixed level without the execution of the torque control process. The determination of the electrical angle with the high accuracy in this embodiment partly depends upon this function.

In the structure of this embodiment, the target torque T* is newly input only immediately after the execution of the electrical angle determination process. The input of the target torque T* is not restricted to the timing immediately after the execution of the electrical angle determination process. For example, in the case where the motor current has a sufficiently quick response with respect to a variation in target torque T*, the target torque T* may be read in the torque control process at the timing B2 shown in FIG. 12.

(3) Second Embodiment

The following describes another motor controller as a second embodiment according to the present invention. The motor controller of the second embodiment has the same hardware configuration and software configuration as those of the motor controller of the first embodiment. The only difference from the motor controller of the first embodiment is the details of the operation control routine.

Figure 13:
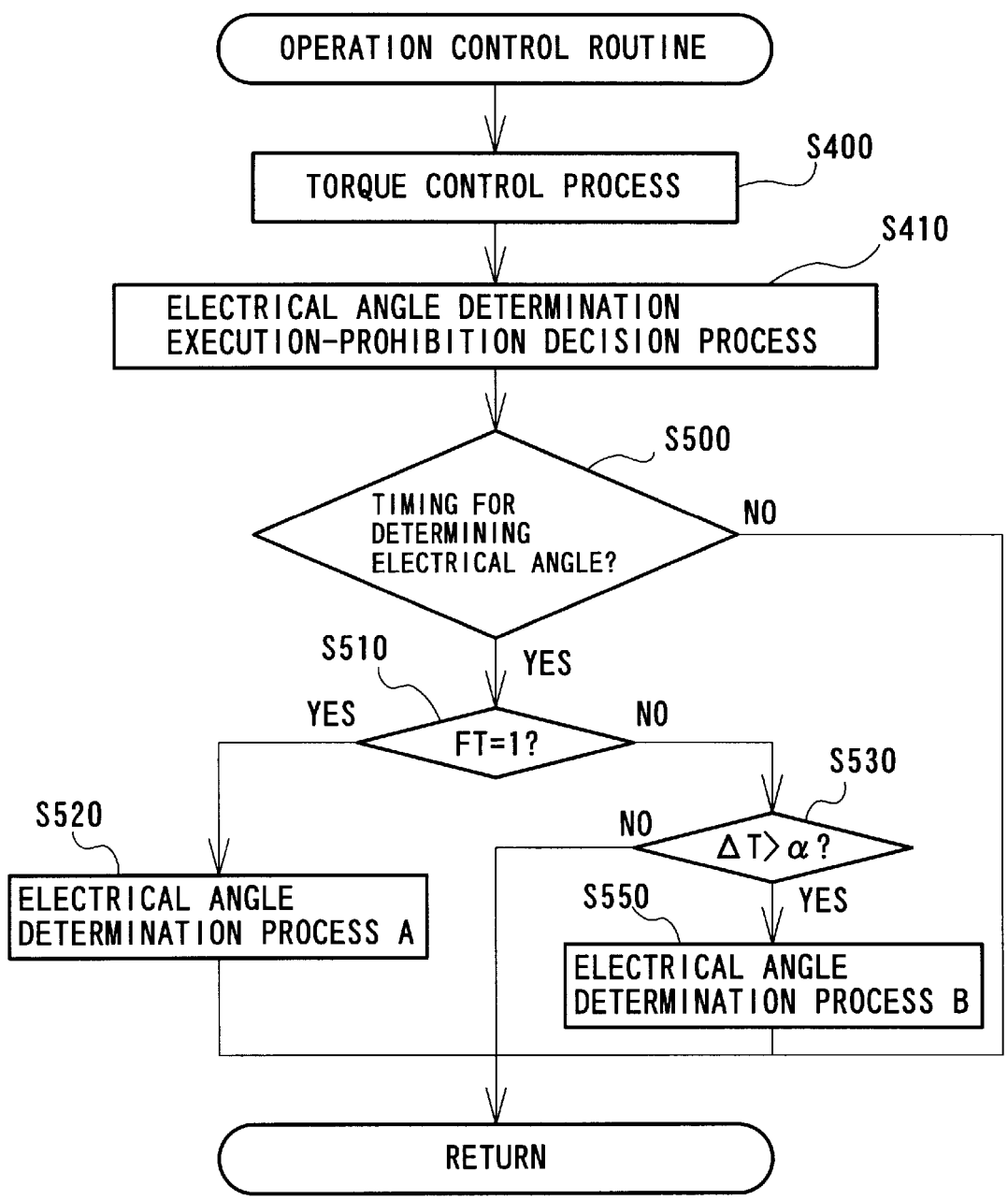
FIG. 13 is a flowchart showing an operation control routine executed in a second embodiment according to the present invention.

FIG. 13 is a flowchart showing an operation control routine executed in the motor controller of the second embodiment. Like the first embodiment, this routine is periodically executed by the CPU 120. When the program enters this routine, the CPU 120 first carries out a torque control process at step S400. The details of the torque control process are substantially identical with those of the torque control process discussed in the first embodiment (see the flowchart of FIG. 10). In the procedure of the first embodiment, the target torque T* is newly input only immediately after the execution of the electrical angle determination process (steps S302 and S304 in FIG. 10). In the structure of the second embodiment, on the other hand, the input of the target torque T* is carried out at a predetermined timing. In the first embodiment, the electrical angle determination process is carried out after the operation control routine is repeatedly executed a predetermined number of times. In a similar manner, the second embodiment reads the target torque T* after the operation control routine is repeatedly executed a predetermined number of times. One possible modification may read the target torque T* in every cycle of the operation control routine.

Figure 14:
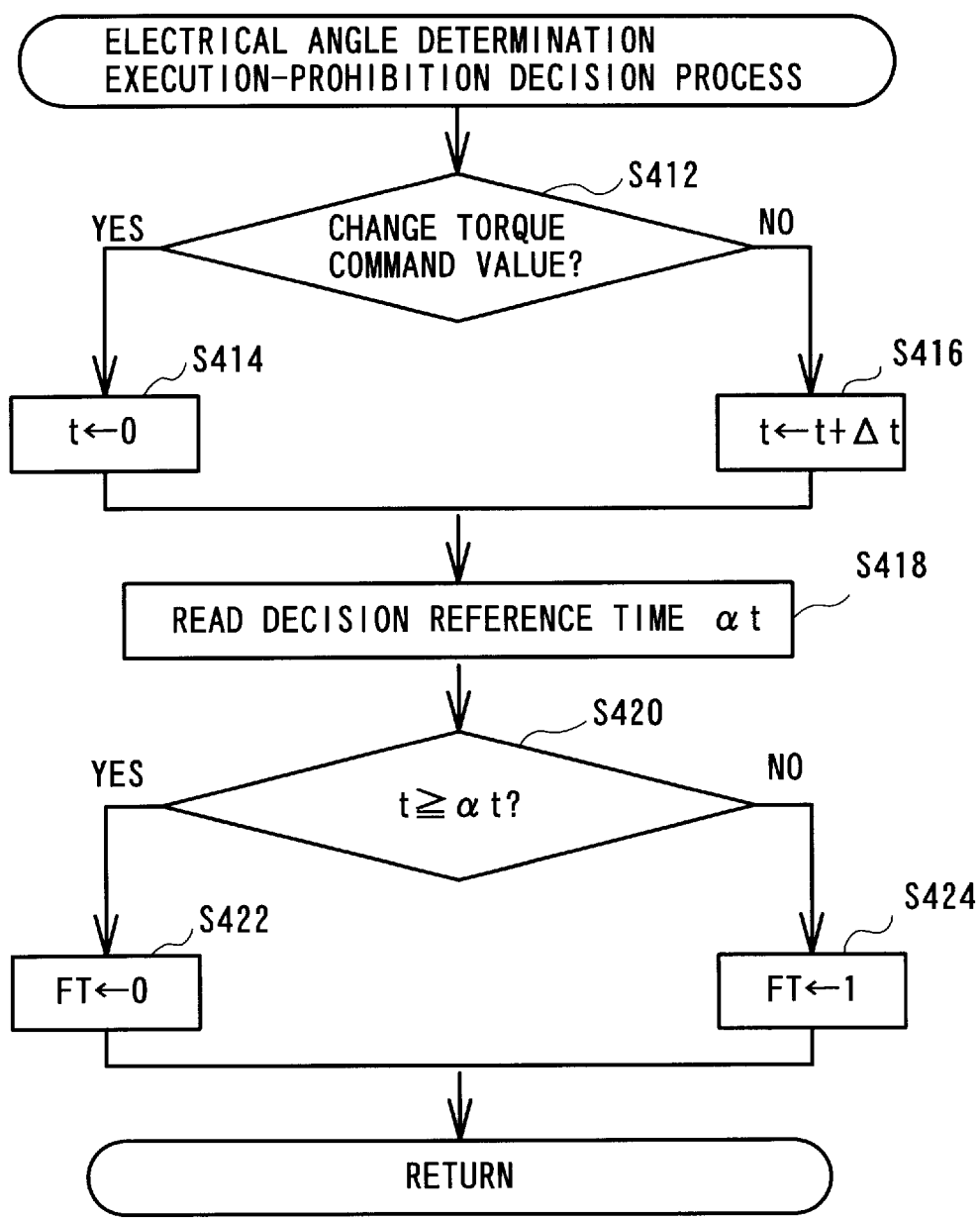
FIG. 14 is a flowchart showing the details of the electrical angle determination execution-prohibition decision process carried out at step S410 in the flowchart of FIG. 13.

After execution of the torque control process, the CPU 120 carries out an electrical angle determination execution-prohibition decision process at step S410. The details of this electrical angle determination execution-prohibition decision process are described with the flowchart of FIG. 14.

When the program enters the routine, the CPU 120 first determines whether or not the torque command value T* has been changed at step S412. The variation in torque command value represents a change from the torque command value in the previous cycle of the operation control routine. In the case where the target torque T* has been input at step S304 in the flowchart of FIG. 10 in the previous cycle of the operation control routine, there is a possibility of changing the torque command value T*. A concrete procedure of step S412 subtracts the previous torque command value from the current torque command value to calculate a torque variation $\Delta T$ and determines whether or not the torque variation $\Delta T$ is equal to zero.

In the case where the torque command value T* has been changed, the program resets an elapse time counter t to the value '0' at step S414. The elapse time counter t counts a time elapsing after the torque command value T* was changed previously. In the case where the torque command value T* has not bee changed, on the other hand, the program increments the elapse time counter t by $\Delta t$ at step S416. The increment $\Delta t$ represents a time interval, at which the electrical angle determination execution-prohibition decision process is carried out. When the processing is repeatedly executed at fixed time intervals, the increment $\Delta t$ takes a constant value. This process measures the time elapsing after the torque command value T* was changed previously.

Figure 15:
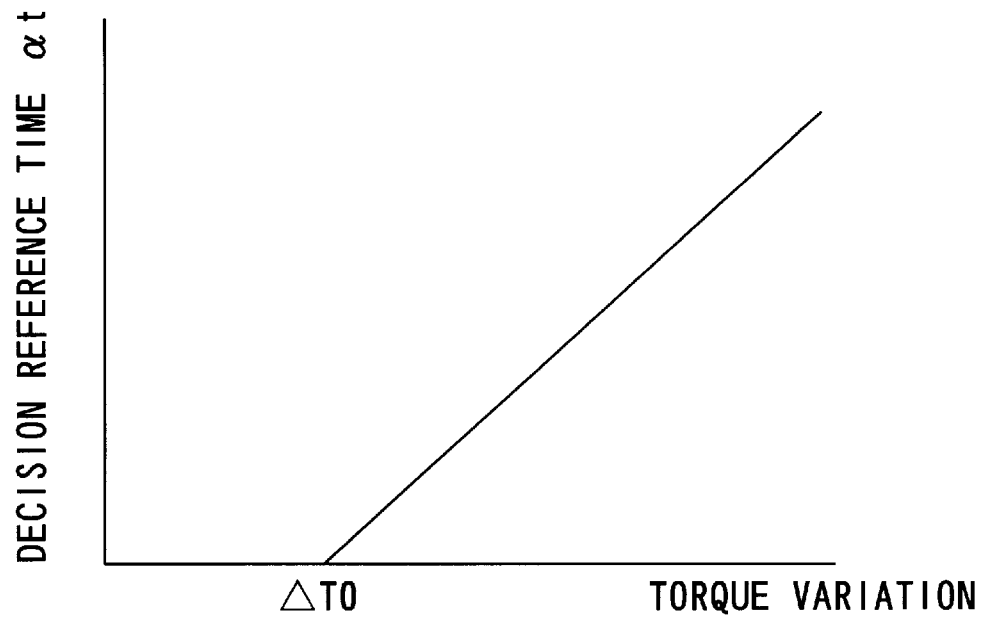
FIG. 15 is a graph showing a variation in decision reference time αt plotted against the torque variation ΔT.

The CPU 120 subsequently reads a decision reference time $\alpha t$ at step S418. The relationship between the decision reference time $\alpha t$ and the torque command value is stored in advance in the form of a map in the ROM 122. FIG. 15 shows an example of such maps. The decision reference time αt is set to increase with an increase in torque variation. In this embodiment, the decision reference time αt is set equal to zero in the range of the torque variation of not greater than ΔT0.

Figure 16:
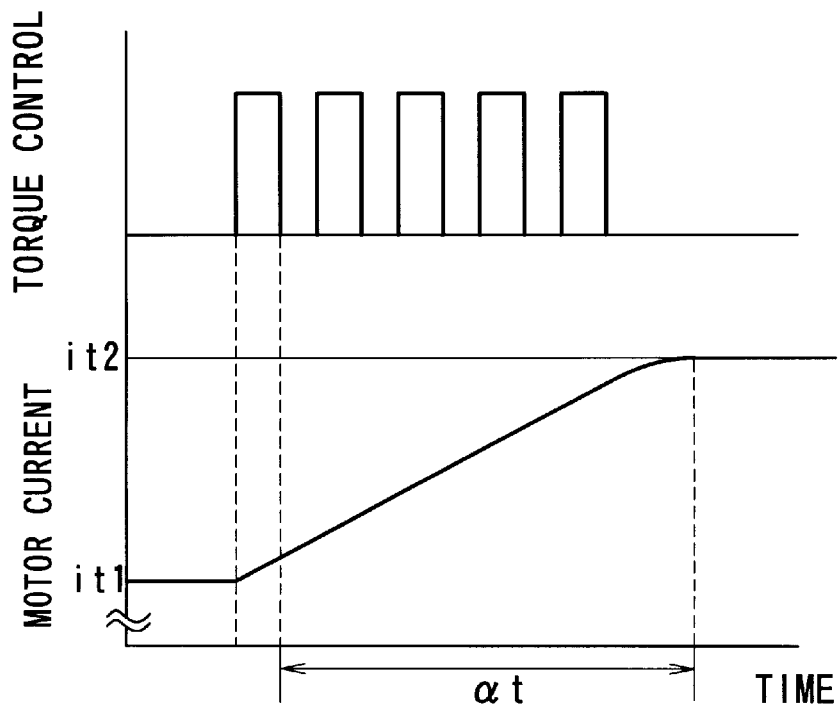
FIG. 16 shows the method of setting the decision reference time αt.

The decision reference time αt is used as the reference time to determine the execution or prohibition of the electrical angle determination process. The method of setting the decision reference time at is discussed with the graph of FIG. 16. In the case of a variation in torque command value, the electric current of the motor 40 gradually increases from an initial value it1 to a target value it2 as shown in FIG. 16. In order to determine the electrical angle with a high accuracy, it is desirable that the electrical angle determination process is carried out after a variation in electric current of the motor due to a variation in torque command value T* is stabilized. The decision reference time αt is a time period between the conclusion of the torque control, which accompanies a variation in torque command value T*, and the stabilization of the variation in electric current, which is accompanied by the variation in torque command value T*, as shown in FIG. 16. The value of the decision reference time αt may be determined in advance by an experiment or analysis according to the characteristics of the motor 40. In the case where the variation in torque command value is relatively small, the variation does not significantly affect the determination of the electrical angle. The decision reference time αt may thus be set equal to zero when the torque variation is not greater than the predetermined value ΔT0, like this embodiment.

The CPU 120 then compares the preset decision reference time αt with the elapse time counter t at step S420. In the case where the elapse time counter t is not less than the decision reference time αt, the program determines that the variation in electric current due to the variation in torque command value is stabilized and does not significantly affect the determination of the electrical angle. The CPU 120 accordingly sets a value '1' that represents execution to a flag FT that represents execution or prohibition of the electrical angle determination process at step S422. In the case where the elapse time counter t is less than the decision reference time αt, the program determines that the variation in electric current due to the variation in torque command value significantly affects the determination of the electrical angle. The CPU 120 accordingly set a value '0' that represents prohibition of the electrical angle determination process to the flag FT at step S424. After the result of the decision is set to the flag FT, the CPU 120 returns to the operation control routine shown in the flowchart of FIG. 13.

The CPU 120 then determines whether or not it is the timing for determining the electrical angle at step S500 in the operation control routine. The concrete procedure applied here to determine the timing of electrical angle determination is the same as that discussed in the first embodiment. Namely the electrical angle determination process is carried out after the operation control routine is repeated a preset number of times. When it is determined at step S500 that it is not the timing for determining the electrical angle, the program does not carry out the further processing and exits from the operation control routine.

When it is determined at step S500 that it is the timing for determining the electrical angle, on the other hand, the CPU 120 subsequently determines whether or not the flag FT is equal to one at step S510. In the case of the flag FT equal to one, the program has determined the execution of the electrical angle determination according to the electrical angle determination execution-prohibition decision routine shown in the flowchart of FIG. 14. The CPU 120 accordingly executes an electrical angle determination process A at step S520. The electrical angle determination process A is identical with the electrical angle determination process shown in the flowchart of FIG. 8 and discussed in the first embodiment. The concrete procedure applies a voltage for determination and determines the electrical angle based on a variation in electric current before and after the application of the voltage. After the determination of the electrical angle, the CPU 120 exits from the operation control routine.

In the case of the flag FT equal to zero, the CPU 120 subsequently determines whether or not the torque variation ΔT is greater than a preset value α at step S530. The torque variation ΔT has been calculated in advance in the electrical angle determination execution-prohibition decision process shown in the flowchart of FIG. 14. When the torque variation ΔT is greater than the preset value α, the CPU 120 executes an electrical angle determination process at step S550. When the torque variation ΔT is not greater than the preset value α, on the other hand, the program exits from the operation control routine.

When the torque command value is frequently varied, a long time period may be taken until the decision of the execution of the electrical angle determination in the electrical angle determination execution-prohibition decision process. In such cases, the electrical angle estimated in the torque control process may have a large error. The electrical angle determination process B is carried out to avoid such situation and applied in the course of a variation in torque command value. The electrical angle determination process B can be executed whenever there is a change in torque command value. In this embodiment, however, in order to ensure the high accuracy of the electrical angle determination, the electrical angle determination process B is carried out only when the torque variation ΔT is greater than the preset value α. The preset value α is accordingly set according to the accuracy of the electrical angle determination in the electrical angle determination process B.

The preset value α may be a specific constant or a variable that varies, for example, according to the elapse of time after the previous cycle of the electrical angle determination process A or the electrical angle determination process B. The torque command value may be varied frequently after the execution of the electrical angle determination process A. In the case where the variation in torque command value is relatively small, there is a possibility that neither the electrical angle determination process A nor the electrical angle determination process is carried out for a long time period. In such cases, the method of decreasing the preset value α according to the elapse of time when neither of the electrical angle determination processes A and B is executed ensures the execution of the electrical angle determination process B.

Figure 17:
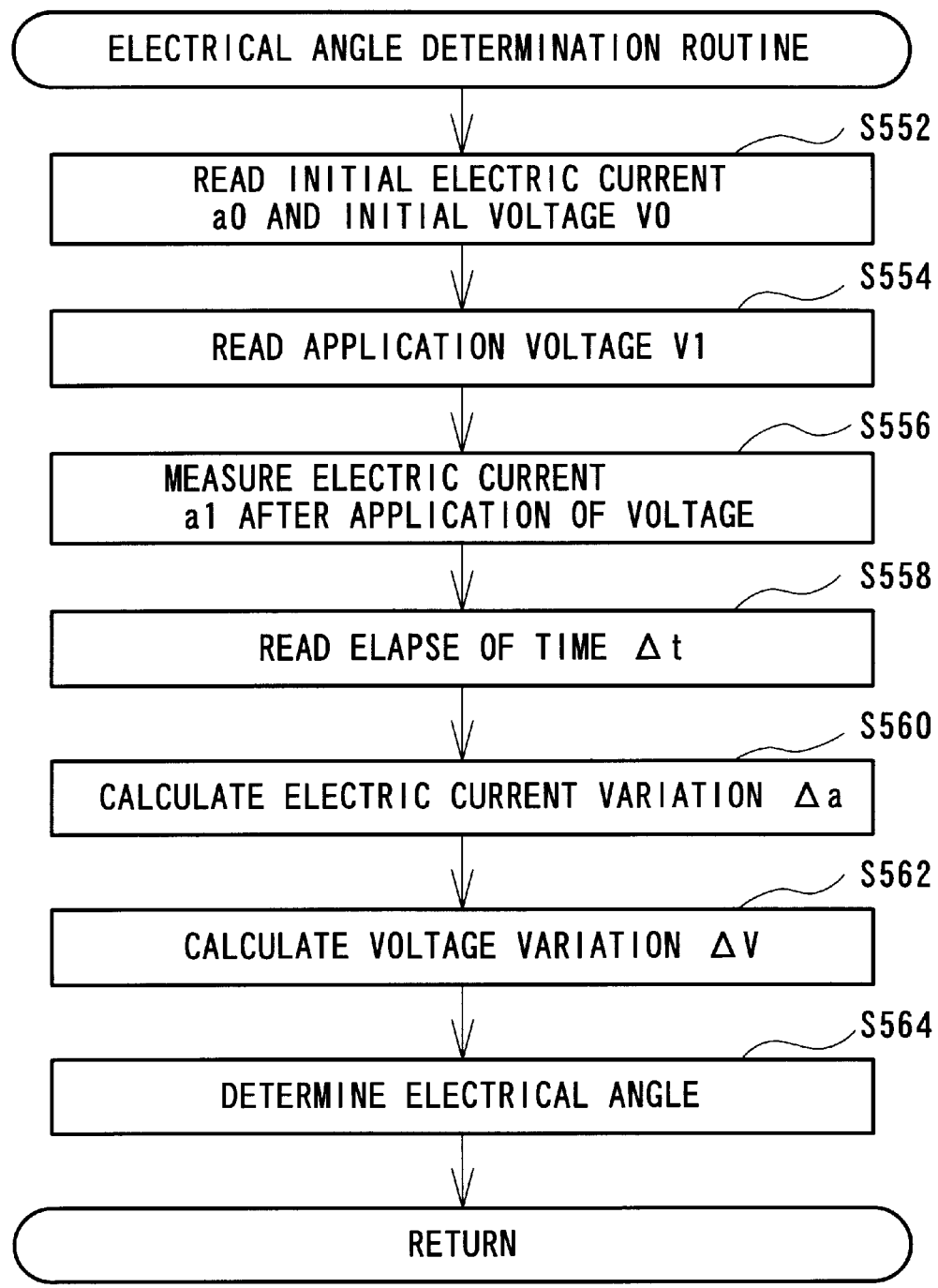
FIG. 17 is a flowchart showing the details of the electrical angle determination process B executed at step S550 in the flowchart of FIG. 13.

The details of the electrical angle determination process B are described with the flowchart of FIG. 17. When the program enters this routine, the CPU 120 successively reads an initial electric current a0, an initial voltage V0, an application voltage V1, an electric current a1 after the application of the voltage, and an elapse of time Δt at steps S552 through S558. These values have been measured or obtained in the torque control routine shown in the flowchart of FIG. 10. The initial electric current a0 is the value of electric current observed at step S308 in the torque control routine. The initial voltage V0 is a voltage command value under the initial electric current a1. The application voltage V1 is a voltage command value set at step S314. The electric current a1 after the application of the voltage is the initial value of electric current observed at step S308 when the torque control routine is executed again after the voltage command value has been set at step S314. The elapse of time Δt represents a time period when the torque control routine is repeatedly executed.

The CPU 120 calculates an electric current variation Δa and a voltage variation ΔV from the input values at steps S560 and S562 and determines the electrical angle at step S564. The concrete procedure of determining the electrical angle is identical with that discussed in the electrical angle determination process of the first embodiment shown in the flowchart of FIG. 8. The procedure substitutes the electric current variation Δa, the application voltage V1, and the elapse of time Δt into Equation (2) shown previously to calculate the inductance L, and refers to the table to read the value of the electrical angle corresponding to the calculated inductance L.

Figure 18:
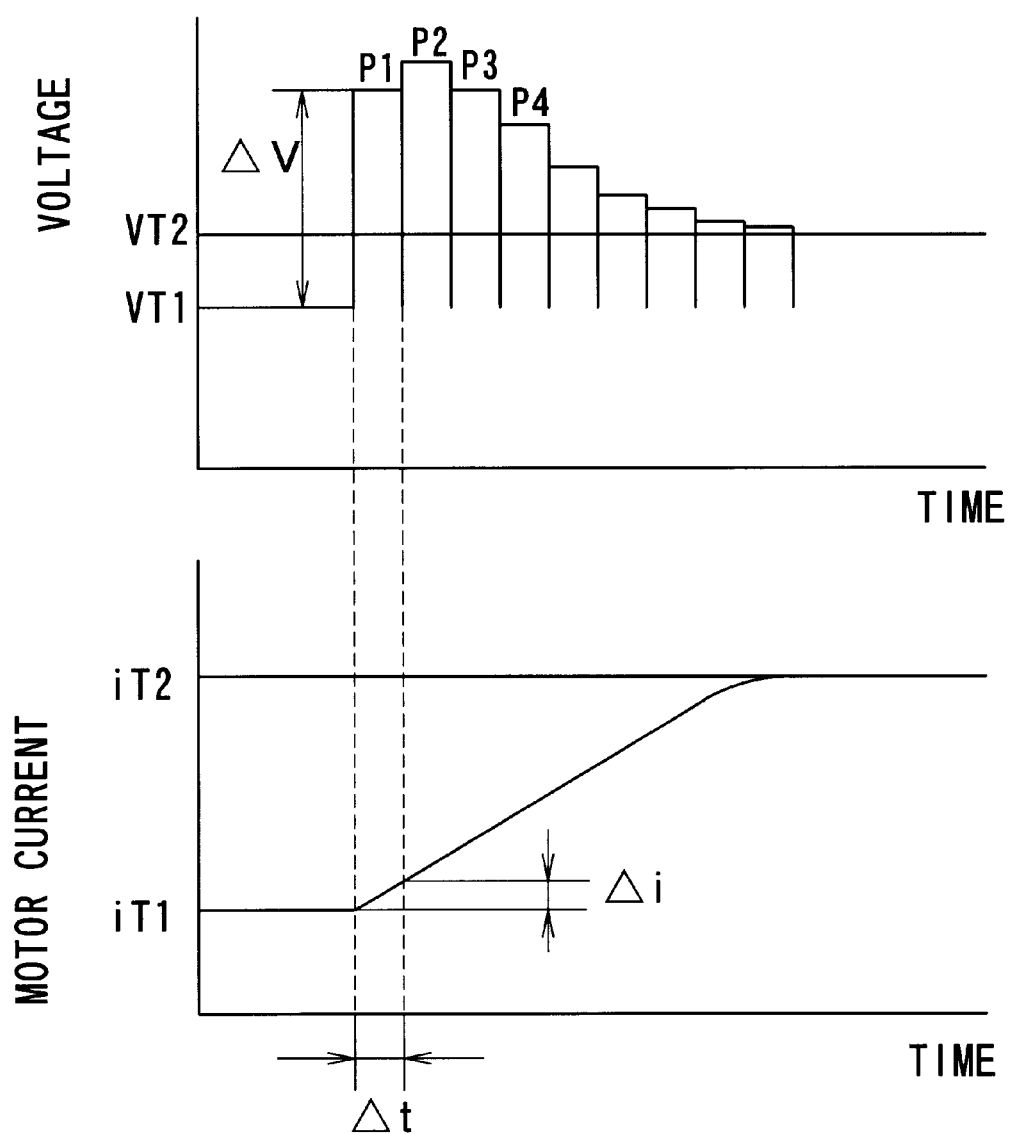
FIG. 18 shows the principle of the electrical angle determination in the electrical angle determination process B.
Figure 20:
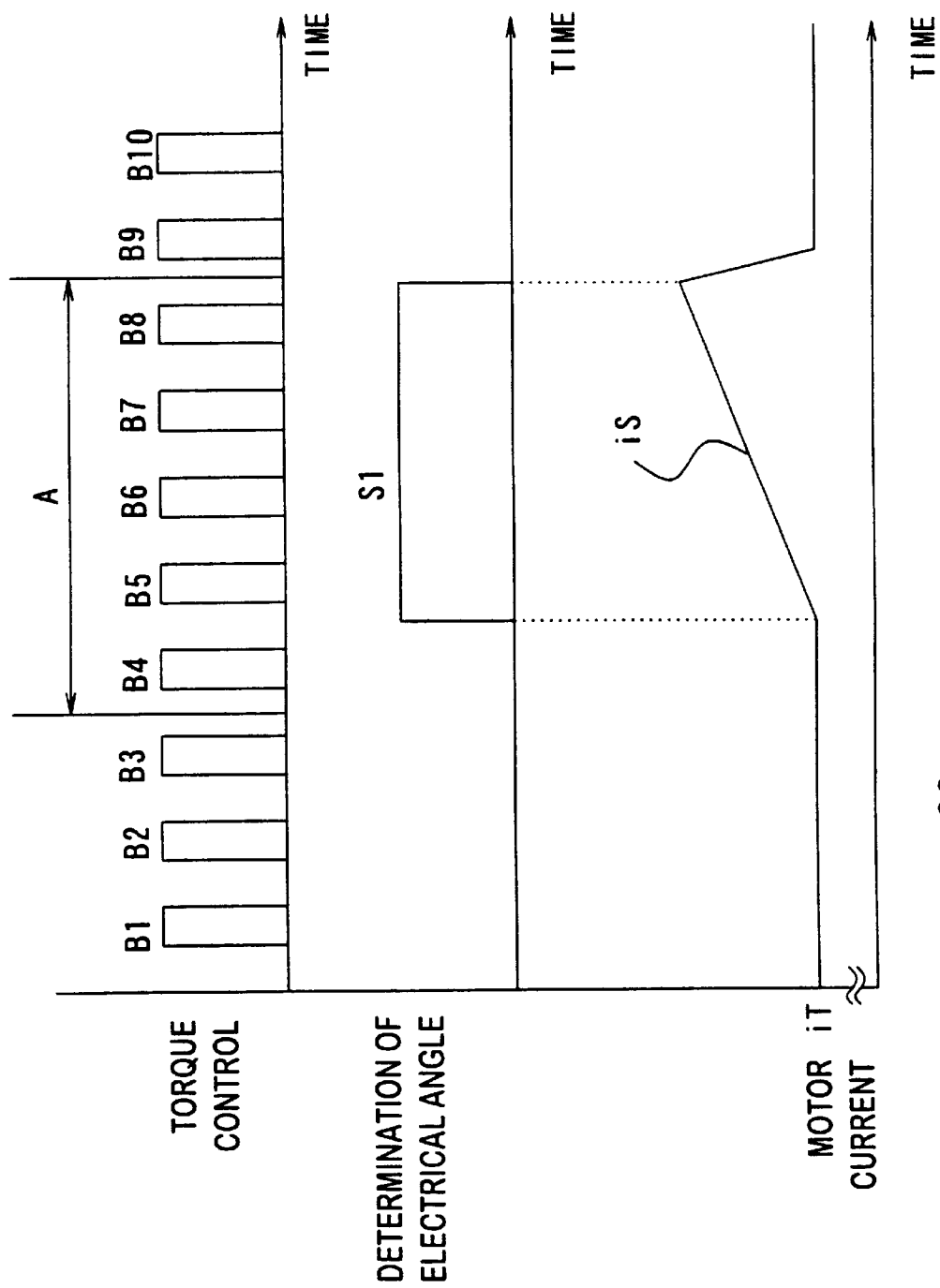
FIG. 20 shows the execution timings of the electrical angle determination process and the torque control process in a prior art procedure.

The principle of the electrical angle determination in the electrical angle determination process B is discussed with the graph of FIG. 18. The graph of FIG. 18 shows variations in voltage and electric current when the torque command value is varied. It should be noted that the time axis has a different scale from that of the similar graphs, such as FIG. 20. The upper half of FIG. 18 shows a variation in voltage. The voltage command value varies from VT1 to VT2 with a variation in torque command value. The structure of this embodiment sets the voltage command value by the PI (proportional-plus-integral) control, so that a greater voltage than VT2 is applied in a transient state of the voltage variation. P1, P2, and P3 in FIG. 18 respectively denote the voltages applied in the respective cycles of the torque control process.

The lower half of FIG. 18 shows the state of motor current varied with the variation in voltage shown in the upper half of FIG. 18. The value of the motor current increases from iT1 to iT2 before and after the variation in torque command value. The electrical angle determination process B deals with the applied voltage as a sort of voltage for determination and thereby implements the determination of the electrical angle. The voltage variation ΔV, the electric current variation Δi, and the elapse of time Δt in the electrical angle determination process B are shown in the graph of FIG. 18. This embodiment regards the case when the voltage of the torque control P1 is utilized to determine the electrical angle. A possible modification may utilize the voltage of another torque control, for example, P2, to determine the electrical angle.

As clearly understood from the graph of FIG. 18, the electrical angle determination process B determines the electrical angle with voltage pulses applied within a very short time period. The electric current variation Δi occurring within this time period is smaller than the same in the standard electrical angle determination process shown in the flowchart of FIG. 8. In order to ensure the high accuracy of the electrical angle determination in the electrical angle determination process B, it is required to measure the electric current variation Δi with a high accuracy. The electric current variation Δi becomes greater with a greater variation in torque command value and improves the accuracy of electrical angle determination. Namely the electrical angle determination process B enables the determination of the electrical angle with the higher accuracy when the torque command value has a greater variation. The motor controller of the embodiment carries out the electrical angle determination process B only when the variation in torque command value ΔT is greater than the preset value α, because of this reason.

The motor controller of the second embodiment carries out the electrical angle determination process when a preset time has elapsed since the variation in torque command value. This arrangement ensures the electrical angle determination with a high accuracy even when the torque command value is changed, and thereby enables appropriate control of the motor 40. This results in driving the motor 40 smoothly and efficiently. The motor controller of the second embodiment can change the frequency of execution of the electrical angle determination process and the accuracy of the electrical angle determination according to the setting of the decision reference time αt.

(4) Third Embodiment

The following describes still another motor controller as a third embodiment according to the present invention. The motor controller of the third embodiment has the same hardware configuration and software configuration as those of the motor controllers of the first and the second embodiments. The only difference from the motor controllers of the first and the second embodiments is the details of the operation control routine.

Figure 19:
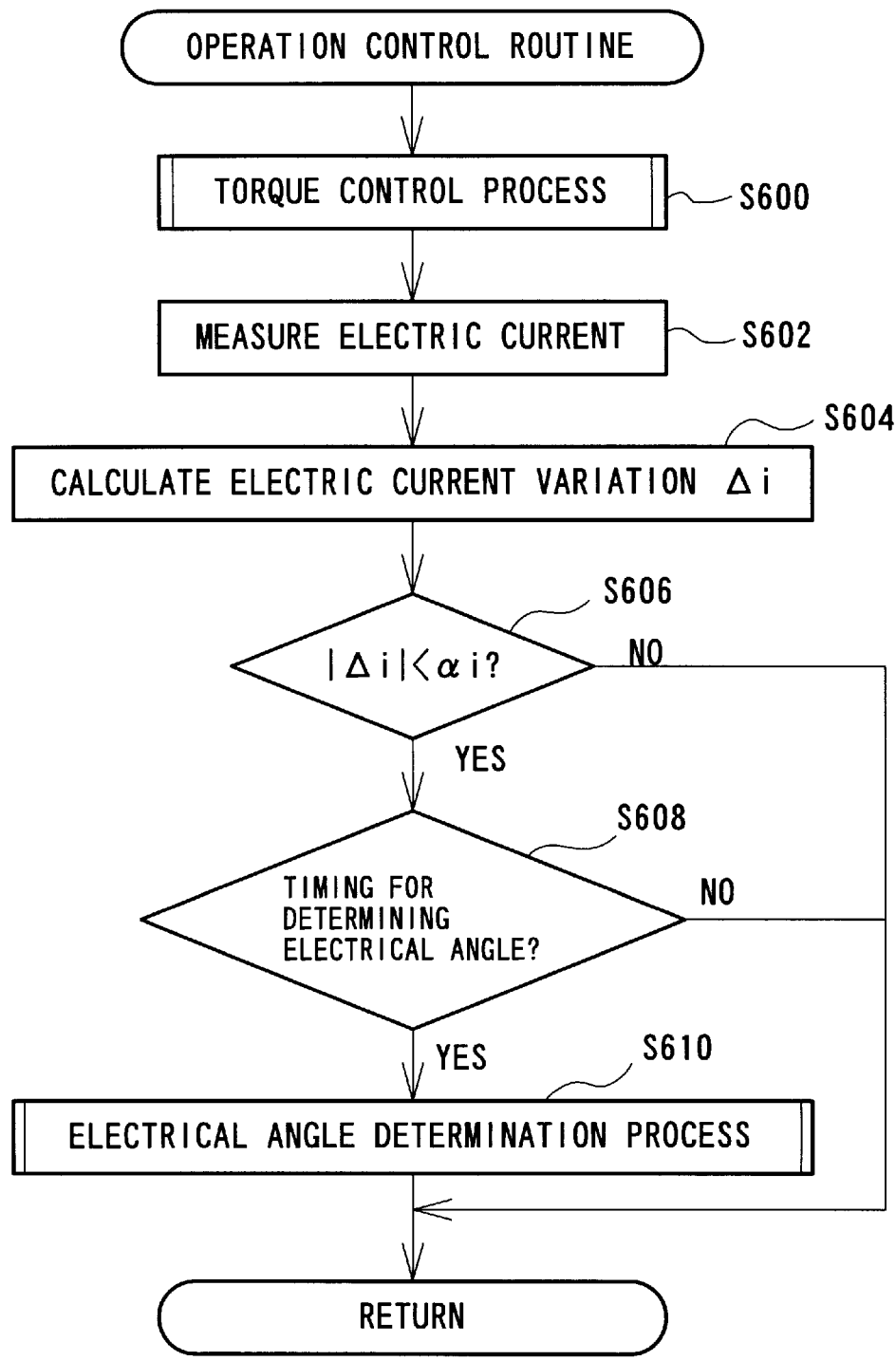
FIG. 19 is a flowchart showing an operation control routine executed in a third embodiment according to the present invention.

The flowchart of FIG. 19 shows the details of the operation control routine executed in the motor controller of the third embodiment. This routine is periodically executed by the CPU 120. When the program enters the operation control routine, the CPU 120 first carries out a torque control process at step S600. The details of the torque control process are substantially similar to those of the torque control process discussed in the first embodiment (see FIG. 10). The structure of the first embodiment reads the target torque T* only when the electrical angle determination process is carried out (see steps S302 and S304 in the flowchart of FIG. 10). The structure of the third embodiment, on the other hand, reads the target torque T* at a predetermined timing. The first embodiment executes the electrical angle determination process every time the operation control routine is repeated a preset number of times. In a similar manner, the third embodiment reads the target torque T* every time the operation control routine is repeated a preset number of times. A possible modification may read the target torque T* in every cycle of the operation control routine.

The CPU 120 then observes the electric current flowing through the respective phases of the motor 40 with the electric sensors 102 and 103 at step S602. The CPU 120 calculates an electric current variation Δi from the observed electric current at step S604. The electric current variation Δi represents a change from the electric current observed at step S602 in the previous cycle of the operation control routine.

The CPU 120 compares the absolute value of the electric current variation Δi with a preset value αi at step S606. In the case where the absolute value of the electric current variation Δi is greater than the preset value αi, it means that the electric current of the motor 40 is varied by the torque control process. The program accordingly does not carry out the determination of the electrical angle and exits from the operation control routine. The preset value αi is a reference value for determining whether a variation in motor current due to the torque control process affects the determination of the electrical angle, and may be set in advance by an experiment or analysis.

The preset value αi may be a specific constant or a variable that varies according to a variety of conditions. In one example, when the torque command value frequently changes and the variation in electric current is not attenuated, the constant value αi may cause the non-execution of the electrical angle determination for a long time period. In order to avoid such situation, a greater value may be set to the preset value αi with an increase in elapse of time after the execution of the electrical angle determination.

In the case where the absolute value of the electric current Δi is less than the preset value αi, on the contrary, the CPU 120 determines whether or not it is the timing for determining the electrical angle at step S608. The concrete procedure of determining the timing for electrical angle determination is identical with that discussed in the first embodiment. The electrical angle determination process is carried out every time the operation control routine is repeated a preset number of times. When it is determined at step S608 that it is not the timing for determining the electrical angle, the program does not carry out the further processing and exits from the operation control routine. When it is determined at step S608 that it is the timing for determining the electrical angle, on the other hand, the CPU 120 carries out an electrical angle determination process at step S610. The concrete procedure of the electrical angle determination process is identical with that discussed in the first embodiment (see the flowchart of FIG. 8).

The motor controller of the third embodiment carries out the electrical angle determination process after the variation in electric current due to the torque control process is attenuated to the range smaller than the preset value αi. This arrangement enables the electrical angle to be determined with a high accuracy without being affected by the variation in electric current due to the torque control process, thereby ensuring the appropriate control of the motor 40. This results in driving the motor 40 smoothly and efficiently.

The motor controller of the third embodiment may be adopted in a modified application. When there is a variation in torque command value in the torque control process, the modified procedure sets a value '1' that represents prohibition to a flag FF that represents execution or prohibition of the electrical angle determination. In the case of the flag FF equal to the value '1', the modified structure prohibits the execution of the electrical angle determination process. When the absolute value of the electric current variation Δi is less than the preset value αi, on the other hand, the flag FF is reset to zero. In principle, this modification prohibits the execution of the electrical angle determination when the torque command value is varied, and permits the execution of the electrical angle determination when the electric current variation Δi becomes smaller than the preset value αi. This structure enables the electrical angle to be determined without being affected by the variation in electric current due to a variation in torque command value.

The present invention is not restricted to the above embodiments or their modifications, but there may be many other modifications, changes, and alterations without departing from the scope or spirit of the main characteristics of the present invention. By way of example, in the above embodiments discussed above, the operation control routine is implemented by the software, which the CPU 120 in the control ECU 100 executes. The processing of the operation control routine may alternatively be attained by the hardware configuration.

The scope and spirit of the present invention are limited only by the terms of the appended claims.

What is claimed is:

1. A motor controller that regulates multi-phase alternating currents made to flow through windings, thereby controlling operation of a synchronous motor, which rotates a rotor by taking advantage of a revolving magnetic field generated in said windings in the course of the flow of the multi-phase alternating currents, said motor controller comprising:

a required torque setting unit that sets a required torque to be output from said motor;

an electrical angle determination unit that applies a voltage for determination to said windings at a predetermined timing and determines an electrical angle of said rotor, based on a behavior of electric currents flowing through said windings in response to the applied voltage for determination;

an electrical angle estimation unit that estimates an electrical angle at each timing when control of the operation of said synchronous motor is carried out, based on the electrical angle determined by said electrical angle determination unit;

a torque control unit that regulates the multi-phase alternating currents made to flow through said windings, according to the required torque and the estimated electrical angle; and an adjustment unit that adjusts execution timings of said torque control unit and said electrical angle determination unit, in order to avoid an effect of the electric currents made to flow through said windings by said torque control unit on the determination of the electrical angle.

2. A motor controller in accordance with claim 1, wherein said adjustment unit adjusts the execution timings of said torque control unit and said electrical angle determination unit, in order to cause the execution of said electrical angle determination unit to precede the execution of said torque control unit.

3. A motor controller in accordance with claim 1, wherein said adjustment unit adjusts the execution timings of said torque control unit and said electrical angle determination unit, in order to cause said electrical angle determination unit to carry out the determination of the electrical angle when a predetermined time period has elapsed after said torque control unit carried out the regulation of the electricity to said windings.

4. A motor controller in accordance with claim 3, wherein the predetermined time period in said adjustment unit is set in advance to increase with an increase in rate of change of the required torque set by said required torque setting unit.

5. A motor controller in accordance with claim 1, said motor controller further comprising:

an electric current measurement unit that observes a variation in electric currents made to flow through said windings by said torque control unit, wherein said adjustment unit adjusts the execution timing of said electrical angle determination unit and thereby causes said electrical angle determination unit to carry out the determination of the electrical angle when the observed variation in electric currents is not greater than a preset value.

6. A motor controller that regulates multi-phase alternating currents made to flow through windings, thereby controlling operation of a synchronous motor, which rotates a rotor by taking advantage of a revolving magnetic field generated in said windings in the course of the flow of the multi-phase alternating currents, said motor controller comprising:

a required torque setting unit that sets a required torque to be output from said motor;

a first electrical angle determination unit that applies a voltage for determination to said windings at a predetermined timing and determines an electrical angle, which defines an electrical position of said rotor, based on a behavior of electric currents flowing through said windings in response to the applied voltage for determination;

an electrical angle estimation unit that estimates an electrical angle at each timing when control of the operation of said synchronous motor is carried out, based on the electrical angle determined by said first electrical angle determination unit;

a torque control unit that regulates the multi-phase alternating currents made to flow through said windings according to the required torque and the estimated electrical angle, so as to enable output of the required torque; and a second electrical angle determination unit that, when the electric currents made to flow through said windings at the predetermined timing by said torque control unit are not less than a predetermined level, carries out the determination of the electrical angle in response to the voltage applied to said windings by said torque control unit, instead of the voltage for determination applied by said first electrical angle determination unit.

7. A motor controller in accordance with claim 6, wherein said second electrical angle determination unit carries out the determination of the electrical angle in the case where a rate of change of the required torque is not less than a predetermined value while the electric currents made to flow through said windings at the predetermined timing by said torque control unit are not less than the predetermined level.

8. A method of regulating multi-phase alternating currents made to flow through windings, thereby controlling operation of a synchronous motor, which rotates a rotor by taking advantage of a revolving magnetic field generated in said windings in the course of the flow of the multi-phase alternating currents, said method comprising the steps of:

(a) setting a required torque to be output from said motor;

(b) applying a voltage for determination to said windings at a predetermined timing and determining an electrical angle of said rotor, based on a behavior of electric currents flowing through said windings in response to the applied voltage for determination;

(c) estimating an electrical angle at each timing when control of the operation of said synchronous motor is carried out, based on the electrical angle determined in said step (b);

(d) regulating the multi-phase alternating currents made to flow through said windings, according to the required torque and the estimated electrical angle; and (e) adjusting execution timings of said step (d) and said step (b), in order to avoid an effect of the electric currents made to flow through said windings in said step (d) on the determination of the electrical angle.

9. A method of regulating multi-phase alternating currents made to flow through windings, thereby controlling operation of a synchronous motor, which rotates a rotor by taking advantage of a revolving magnetic field generated in said windings in the course of the flow of the multi-phase alternating currents, said method comprising the steps of:

(a) setting a required torque to be output from said motor;

(b) applying a voltage for determination to said windings at a predetermined timing and determining an electrical angle, which defines an electrical position of said rotor, based on a behavior of electric currents flowing through said windings in response to the applied voltage for determination;

(c) estimating an electrical angle at each timing when control of the operation of said synchronous motor is carried out, based on the electrical angle determined in said step (b);

(d) regulating the multi-phase alternating currents made to flow through said windings according to the required torque and the estimated electrical angle, so as to enable output of the required torque; and (e) when the electric currents made to flow through said windings at the predetermined timing in said step (d) is not less than a predetermined level, carrying out the determination of the electrical angle in response to the voltage applied to said windings in said step (d), instead of the voltage for determination applied in said step (b).

* * * * *